(12) United States Patent
Hara et al.

(10) Patent No.: US 8,265,820 B2
(45) Date of Patent: Sep. 11, 2012

(54) SADDLE RIDING TYPE VEHICLE

(75) Inventors: Nobuo Hara, Shizuoka (JP); Kenichi Watanabe, Shizuoka (JP); Yasuhiro Oomura, Shizuoka (JP); Takafumi Nonaka, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 597 days.

(21) Appl. No.: 12/471,560

(22) Filed: May 26, 2009

(65) Prior Publication Data
US 2009/0299565 A1 Dec. 3, 2009

(30) Foreign Application Priority Data
May 29, 2008 (JP) .................................. 2008-141008

(51) Int. Cl.
G01M 17/00 (2006.01)
G06F 7/00 (2006.01)
G06F 11/30 (2006.01)
G06F 19/00 (2011.01)
G07C 5/00 (2006.01)

(52) U.S. Cl. ......... 701/29.1; 280/6.15; 280/29; 280/200

(58) Field of Classification Search ................ 701/29.1; 280/5.52, 5.509, 6.15, 6.154, 282, 304.3, 280/29, 200; 180/65.1, 210
See application file for complete search history.

(56) References Cited

U.S. PATENT DOCUMENTS

| | | | | |
|---|---|---|---|---|
| 3,829,110 | A * | 8/1974 | Ray .............................. | 280/304.3 |
| 4,351,410 | A * | 9/1982 | Townsend ..................... | 180/210 |
| 5,762,351 | A * | 6/1998 | SooHoo ......................... | 280/267 |
| 6,724,165 | B2 * | 4/2004 | Hughes ......................... | 318/376 |
| 6,941,206 | B2 * | 9/2005 | Hasegawa et al. .............. | 701/38 |
| 7,591,337 | B2 * | 9/2009 | Suhre et al. ..................... | 180/210 |
| 7,802,800 | B2 * | 9/2010 | Melcher ...................... | 280/5.509 |
| 2005/0012291 | A1 | 1/2005 | Bagnoli | |
| 2005/0167208 | A1 | 8/2005 | Marcacci | |
| 2005/0275516 | A1 | 12/2005 | Lang | |

FOREIGN PATENT DOCUMENTS

| | | |
|---|---|---|
| EP | 1 884 457 A1 | 2/2008 |
| JP | 2004-359232 A | 12/2004 |
| JP | 2005-306363 A | 11/2005 |
| WO | 2007/127783 A1 | 11/2007 |

OTHER PUBLICATIONS

Official Communication issued in corresponding European Patent Application No. 09007085.5, mailed on Jul. 30, 2009.

* cited by examiner

Primary Examiner — Khoi Tran
Assistant Examiner — Jamie Figueroa
(74) Attorney, Agent, or Firm — Keating & Bennett, LLP

(57) ABSTRACT

A saddle riding type vehicle includes a support mechanism arranged to support a pair of wheels to be movable up and down relative to a vehicle body, a lock mechanism connectable to the support mechanism and arranged to limit up-and-down motion of the pair of wheels, various sensors arranged to detect vehicle states, and a controller arranged to control the lock mechanism based on results of detection by the various sensors. The controller controls the lean limitation to the up-and-down motion of the pair of wheels and its cancellation automatically. The rider need not carry out a special control for operating the lock mechanism. In addition, the lock mechanism is controlled according to the vehicle states, which allows the rider to travel lightly and comfortably.

11 Claims, 11 Drawing Sheets

SADDLE RIDING TYPE VEHICLE

BACKGROUND OF THE INVENTION

1. Field of the Invention

The present invention relates to a saddle riding type vehicle such as a three-wheeled or four-wheeled automotive vehicle having a pair of wheels at least at the front or rear of a vehicle body and being able to make turns by leaning the vehicle body.

2. Description of the Related Art

A saddle riding type vehicle has a pair of wheels located at both sides of the vehicle body at the front and/or rear of the vehicle body, and a support mechanism for supporting at least one pair of wheels to be movable up and down in substantially opposite directions relative to the vehicle body. The saddle riding type vehicle constructed in this way can make turns by leaning the vehicle body, as does a motorcycle (as disclosed in Japanese Unexamined Patent Publication No. 2004-359232, for example).

Japanese Unexamined Patent Publication No. 2004-359232 discloses a three-wheeled automotive vehicle having a pair of wheels provided at the front of a vehicle body. A mechanism supporting the pair of wheels at the front is a roll mechanism having a shape of an articulated square, which includes two crossbars arranged vertically and rotatably supported at the forward end of a main frame, a right side tube connected to right ends of both crossbars, and a left side tube connected to left ends of both crossbars. The pair of right and left tubes rotatably support the pair of wheels. The support mechanism constructed in this way supports the pair of wheels to be movable up and down relative to the vehicle body. Thus, the vehicle disclosed in the above patent publication makes turns while leaning the main frame with the pair of wheels contacting the road surface.

The above saddle riding type vehicle further includes a lock mechanism for limiting leaning of the vehicle body, and a switch operable by the rider to operate the lock mechanism. Since the vehicle body will not lean further when the lock mechanism operates, the vehicle body can be maintained in a self-sustainable state resting on the three or four wheels. Therefore, by operating the switch to operate the lock mechanism, the rider need not put his or her feet on the road surface to support the vehicle body at each stop to wait for the traffic light to change, for example. It is also unnecessary to use a stand when parking the vehicle (as disclosed in Japanese Unexamined Patent Publication No. 2005-306363, for example).

However, the conventional vehicle with such a construction has the following drawback.

It is bothersome for the rider to operate the switch manually in order to operate the lock mechanism. It is especially bothersome to operate the lock mechanism when the vehicle runs at low speed before stopping or after starting. There is an inconvenience that the lock mechanism is not easy to use in an actual traveling situation.

SUMMARY OF THE INVENTION

In order to overcome the problems described above, preferred embodiments of the present invention provide a saddle riding type vehicle having at least a pair of wheels, capable of making turns by leaning the vehicle body, and allowing the leaning of the vehicle body to be restricted and freed automatically.

According to a preferred embodiment of the present invention, a saddle riding type vehicle is capable of making turns by leaning a vehicle body and includes a support mechanism arranged to support at least a pair of wheels provided at opposite sides of the vehicle body to be movable up and down relative to the vehicle body; a lean limiting mechanism connected to the support mechanism and arranged to limit up-and-down motion of the pair of wheels; a state detecting device arranged to detect vehicle states; and a controller arranged to control the lean limiting mechanism based on results of detection by the state detecting device.

According to a preferred embodiment of the present invention, the support mechanism is provided to support a pair of wheels to be movable up and down relative to the vehicle body. Thus, with leaning of the vehicle body, both of the wheels can contact the ground. The vehicle can therefore run by leaning the vehicle body at a time of making a turn, for example. The lean limiting mechanism is arranged to limit up-and-down motion of the pair of wheels so as to inhibit leaning of the vehicle body. Further, the controller controls the lean limiting mechanism based on the results of detection by the state detecting device. The lean limitation of the up-and-down motion of the pair of wheels and its cancellation are executed automatically, which relieves the rider of the need to make a special effort to operate the lean limiting mechanism. Since control of the lean limiting mechanism by the controller is based on vehicles states, the lean limitation of the up-and-down motion of the pair of wheels and its cancellation can be carried out properly. The rider can therefore travel lightly and comfortably.

Here, the "saddle riding type vehicle" includes, besides a vehicle driven by the rider straddling the saddle, a scooter type vehicle driven by the rider seated with his or her legs close together. The "vehicle body" refers to a main frame and components fixed to be integral therewith.

In the preferred embodiment of the present invention described above, it is preferred that the state detecting device includes a vehicle speed detector arranged to detect a vehicle speed, and a throttle position detector arranged to detect a throttle opening; and the controller is arranged to cause the lean limiting mechanism to set a lean limitation when the vehicle speed is below a predetermined speed and the throttle opening is below a predetermined opening. The controller determines based on results of detection by the vehicle speed detector and throttle position detector whether the vehicle speed is below a predetermined speed, and whether the throttle opening is below a predetermined opening. When actually stopping the running vehicle, a brake operation may be carried out eventually, or may be withheld to the last. The latter case occurs, for example, in a situation where vehicle speed has fallen to an extremely slow level as in a congested traffic situation. In view of this, the controller can make a determination suitably in both the former and latter cases.

When a determination is made that the vehicle is in the above predetermined state, the controller causes the lean limiting mechanism to set the lean limit. With the lean limitation set by the lean limiting mechanism, the vehicle body will not lean in either direction. When vehicle speed becomes zero while the lean limiting mechanism is operating as above, the vehicle can sustain itself without the rider's feet touching the ground. Thus, the rider can stop the vehicle comfortably without carrying out a special manual control for operating the lean limiting mechanism.

In the preferred embodiment of the present invention described above, it is preferred that the state detecting device includes a vehicle speed detector arranged to detect a vehicle speed, a throttle position detector arranged to detect a throttle opening, and a brake detector arranged to detect a brake operation; and the controller is arranged to cause the lean limiting mechanism to set a lean limitation when the vehicle speed is below a predetermined speed, the throttle opening is below a predetermined opening, and the brake operation is taking place. The controller determines based on results of detection by the vehicle speed detector, throttle position detector and brake detector whether the vehicle speed is below a predetermined speed, whether the throttle opening is below a predetermined opening, and whether the brake operation is taking place. When actually stopping the running vehicle, a brake operation is often carried out eventually. In view of this, the controller can detect stopping of the vehicle. Seen from a different point of view, the controller can grasp the rider's clear intention "to stop" based on the vehicle states.

When a determination is made that the vehicle is in the above predetermined state, the controller causes the lean limiting mechanism to set the lean limit. Thus, the rider can stop the vehicle comfortably without carrying out a special manual control for operating the lean limiting mechanism.

In the preferred embodiment of the present invention described above, it is preferred that the state detecting device includes a vehicle speed detector arranged to detect a vehicle speed, a throttle position detector arranged to detect a throttle opening, and a brake detector arranged to detect a brake operation; and the controller is arranged to cause the lean limiting mechanism to set a lean limitation when the vehicle is in at least one of states (A) where the vehicle speed is below a first speed and the throttle opening is below a first opening, and (B) where the vehicle speed is below a second speed higher than the first speed, the throttle opening is below the first opening and the brake operation is taking place. The controller causes the lean limiting mechanism to set the lean limitation when the vehicle is in the state (A) determined by the vehicle speed, throttle opening and presence or absence of a brake operation, or in the state (B) determined by the vehicle speed and throttle opening, regardless of presence or absence of a brake operation. As a result, the lean limiting mechanism can be operated in various situations of actually stopping the vehicle. The two states (A) and (B) may be specified to partially overlap each other, or not to overlap each other.

In the preferred embodiment of the present invention noted above, it is preferred that the state detecting device includes a throttle position detector arranged to detect a throttle opening; and the controller is arranged to cancel a lean limitation by the lean limiting mechanism when the throttle opening exceeds a predetermined opening. The controller determines based on the result of detection by the throttle position detector whether the throttle opening is below a predetermined opening. When actually starting the vehicle, the throttle opening enlarges before vehicle speed increases. In view of this, the controller can effectively detect a time of starting the vehicle. Seen from a different point of view, the controller can conveniently grasp the rider's intention "to start" from the vehicle states.

When a determination is made that the vehicle is in the above predetermined state, the controller cancels the lean limitation by the lean limiting mechanism. The cancellation allows the vehicle body to lean. The rider can therefore ride the vehicle with a feeling similar to that of riding a motorcycle, such as when making a turn by leaning the vehicle body. Thus, the rider can start the vehicle comfortably, and travel comfortably thereafter, without carrying out a special manual control for canceling the lean limitation by the lean limiting mechanism.

In the preferred embodiment of the present invention described above, it is preferred that the state detecting device includes a vehicle speed detector arranged to detect a vehicle speed; and the controller is arranged to cancel a lean limitation by the lean limiting mechanism when the vehicle speed exceeds a predetermined speed. The controller determines based on the result of detection by the vehicle speed detector whether the vehicle speed exceeds a predetermined speed. Even while the vehicle remains in the same running state, there may actually occur a case where a throttle valve is open, and a case where the throttle valve is closed. An example of the latter is a situation where the vehicle runs on a downhill road. The controller according to a preferred embodiment of the present invention can detect both the former and latter cases. When a determination is made that the vehicle is in the above predetermined state, the controller cancels the lean limitation by the lean limiting mechanism. Thus, the rider can drive the vehicle comfortably without carrying out a special manual control for canceling the lean limitation by the lean limiting mechanism.

In the preferred embodiment of the present invention described above, it is preferred that the state detecting device includes a vehicle speed detector arranged to detect a vehicle speed, and a brake detector arranged to detect a brake operation; and the controller is arranged to cancel a lean limitation by the lean limiting mechanism when the vehicle speed exceeds a predetermined speed, and the brake operation is off. The controller determines based on the results of detection by the vehicle speed detector and brake detector whether the vehicle speed exceeds a predetermined speed and the brake operation is off. Even while the vehicle is in the same running state, there may actually occur a case where a throttle valve is open, and a case where the throttle valve is closed. Further, in the latter case, the vehicle speed may be at a level that requires a brake operation, or may be so low that a brake operation is unnecessary. The controller according to a preferred embodiment of the present invention can detect any one of the above cases. When a determination is made that the vehicle is in the above predetermined state, the controller cancels the lean limitation by the lean limiting mechanism. Thus, the rider can drive the vehicle comfortably without carrying out a special manual control for canceling the lean limitation by the lean limiting mechanism.

In the preferred embodiment of the present invention described above, it is preferred that the state detecting device includes a vehicle speed detector arranged to detect a vehicle speed, and a brake detector arranged to detect a brake operation; and the controller is arranged to cancel a lean limitation by the lean limiting mechanism when the vehicle is in at least one of states where the vehicle speed exceeds a third speed and the brake operation is off, and where the vehicle speed exceeds a fourth speed higher than the third speed. The controller cancels the lean limitation by the lean limiting mechanism when the vehicle is in a state determined by the vehicle speed and the presence or absence of the brake operation, or in a state determined by the vehicle speed alone. Thus, the lean limitation by the lean limiting mechanism can be canceled in various situations of actually driving the vehicle. The two states may be specified to partially overlap each other, or not to overlap each other.

In the preferred embodiment of the present invention described above, it is preferred that the controller is arranged to cancel a lean limitation by the lean limiting mechanism when the vehicle is in at least one of states (a) where the throttle opening exceeds a second opening larger than the first opening, (b) where the vehicle speed exceeds a third speed higher than the first speed and lower than the second speed, and the brake operation is off, and (c) where the vehicle speed exceeds a fourth speed higher than the second speed. The controller cancels the lean limitation by the lean limiting mechanism when the vehicle is in a state (a) determined by the throttle opening only, in a state (b) determined by the vehicle speed and brake operation, or in a state (c) determined by the vehicle speed only. Thus, the lean limitation by the lean limiting mechanism can be canceled in various situations of actually starting and driving the vehicle. The three states (a), (b) and (c) may be specified to overlap one another, or not to overlap one another.

In the preferred embodiment of the present invention described above, it is preferred that the vehicle also includes an input unit arranged to accept a command from a rider for at least one of a lean limitation by the lean limiting mechanism and cancellation of the lean limit, wherein the controller is arranged to control the lean limiting mechanism based on the command from the input unit. This construction allows the rider to operate the lean limiting mechanism directly.

In the preferred embodiment of the present invention described above, it is preferred that the vehicle also includes an operation detector for detecting an operating state of the lean limiting mechanism, wherein the controller is arranged to determine based on a result of detection by the operation detector whether the lean limiting mechanism is operating normally. With the operation detector, any defective operation of the lean limiting mechanism can be detected conveniently.

In the preferred embodiment of the present invention described above, it is preferred that the lean limiting mechanism includes a solenoid having a movable portion, and a connector to which the movable portion is connectable, the movable portion connecting to and withdrawing from the connector to set a lean limitation of up-and-down motion of the pair of wheels and to cancel the lean limit; and the controller is arranged to control electrification of the solenoid for connecting and withdrawing the movable portion to/from the connector. This construction realizes an improved response of the lean limiting mechanism. Thus, the rider can ride the vehicle with increased comfort.

In the preferred embodiment of the present invention described above, it is preferred that the support mechanism includes a right side support mechanism arranged to vertically movably support a right wheel in the pair of wheels; a left side support mechanism arranged to vertically movably support a left wheel in the pair of wheels; and a balancer mechanism rotatably supported by the vehicle body and interlocked to the right side and left side support mechanisms so as to allow the right wheel and the left wheel to move up and down in corresponding amounts in opposite directions; and the lean limiting mechanism is arranged to lock the balancer mechanism against rotation, thereby to limit up-and-down motion of the pair of wheels. This realizes a desirable construction of the lean limiting mechanism.

Many other preferred embodiments relating to saddle riding type vehicles are also disclosed herein.

In another preferred embodiment of the present invention, the support mechanism is preferably arranged to support a pair of wheels provided at a front of the vehicle body and a pair of wheels provided at a rear of the vehicle body to be movable up and down relative to the vehicle body, respectively; and the lean limiting mechanism is connected to the support mechanism corresponding to the pair of wheels provided at one of the front and the rear.

According to this preferred embodiment of the present invention, even where the support mechanism supports two pairs of wheels provided at the front and rear of the vehicle body, the leaning of the vehicle body can be limited effectively by providing the lean limiting mechanism for only one of the front portion and rear portion. This realizes a simplified construction.

In another preferred embodiment of the present invention, the controller is arranged such that, when a command is given thereto from the input unit, the controller places priority on control of the lean limiting mechanism based on this command over control of the lean limiting mechanism based on the results of detection by the state detecting device.

According to this preferred embodiment of the present invention, even when a command inputted by the rider is different from the control of the lean limiting mechanism based on vehicle states, the lean limiting mechanism can be operated according to the command given by the rider.

In another preferred embodiment of the present invention, the controller is further arranged to repeat control of the lean limiting mechanism when the lean limiting mechanism is determined to be operating abnormally.

According to this preferred embodiment of the present invention, the lean limiting mechanism can be operated with increased reliability.

In another preferred embodiment of the present invention, the support mechanism preferably includes a right swing arm rotatable relative to the vehicle body about an axis extending transversely of the vehicle body to move a right wheel of the pair of wheels up and down, a left swing arm rotatable relative to the vehicle body about an axis extending transversely of the vehicle body to move a left wheel of the pair of wheels up and down, and a balancer mechanism rotatable about a rotary shaft extending substantially longitudinally of the vehicle body and interlocked to each of the right and left swing arms, so as to make up-and-down motions of the right wheel and the left wheel equal in amount and opposite in direction; and the lean limiting mechanism is arranged to limit up-and-down motion of the pair of wheels by rendering at least one of the right swing arm and the left swing arm unrotatable.

According to this preferred embodiment of the present invention, the support mechanism can be simplified in construction.

Other features, elements, arrangements, steps, characteristics and advantages of the present invention will become more apparent from the following detailed description of preferred embodiments of the present invention with reference to the attached drawings.

BRIEF DESCRIPTION OF THE DRAWINGS

For the purpose of illustrating the present invention, there are shown in the drawings several forms which are presently preferred, it being understood, however, that the present invention is not limited to the precise arrangement and instrumentalities shown.

DETAILED DESCRIPTION OF THE PREFERRED EMBODIMENTS

Figure 1:
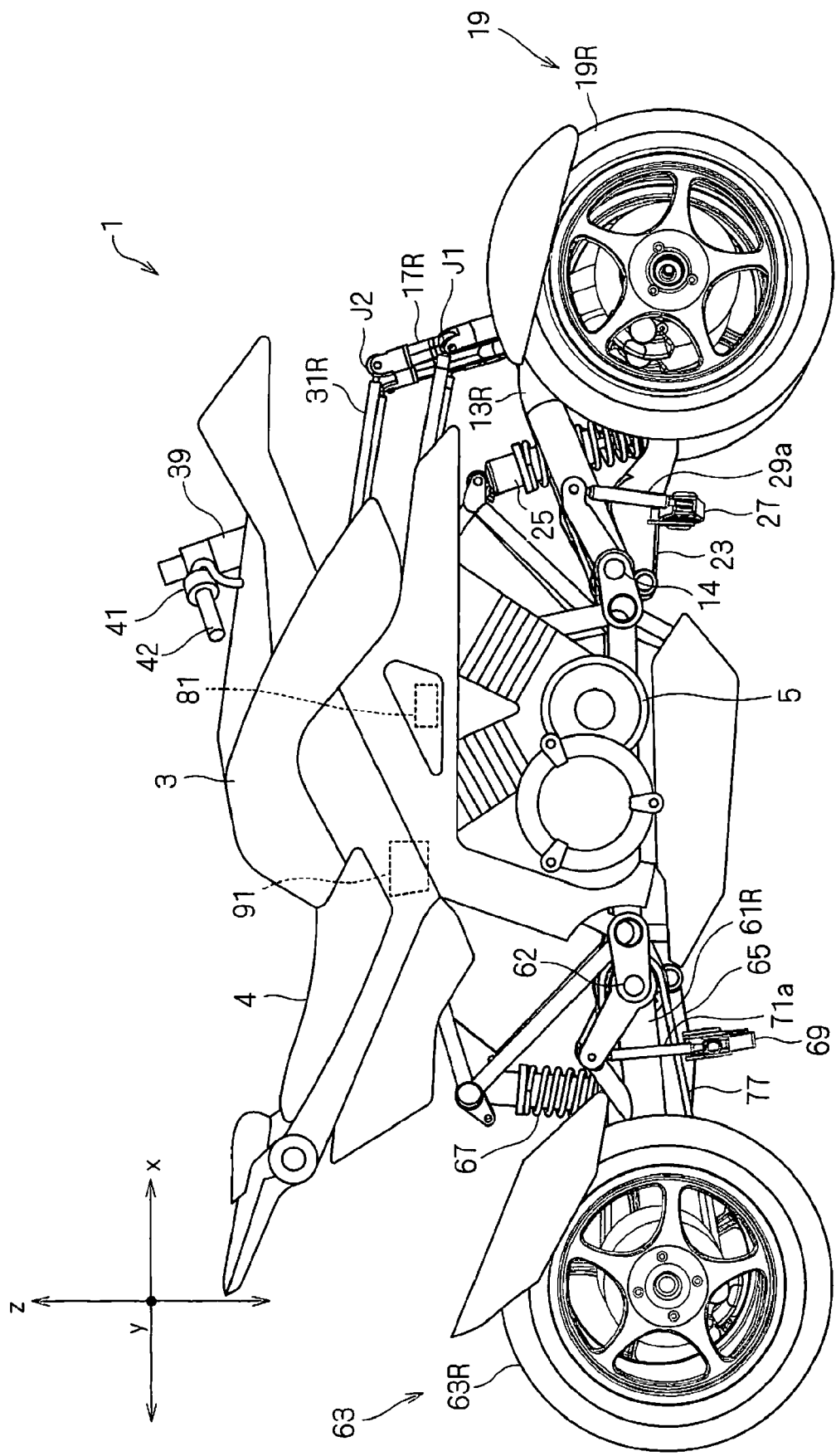
FIG. 1 is a side view showing an outward appearance of a saddle riding type vehicle according to a preferred embodiment of the present invention.

Preferred embodiments of the present invention will be described in detail herein after with reference to the drawings.

A saddle riding type vehicle according to a preferred embodiment of the present invention will be described herein after referring to the drawings.

Figure 2:
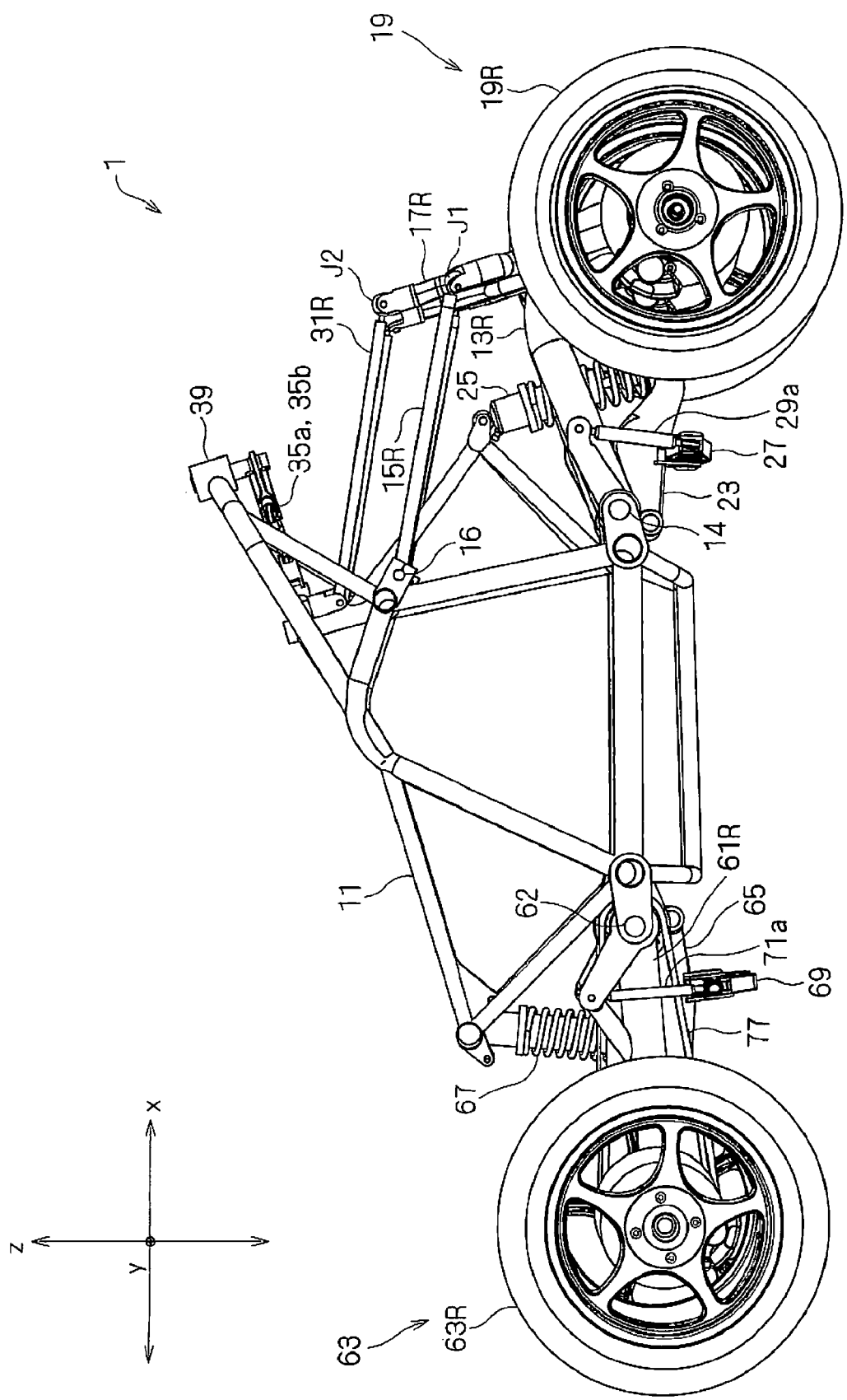
FIG. 2 is a side view showing an outline construction of the saddle riding type vehicle according to a preferred embodiment of the present invention.
Figure 3:
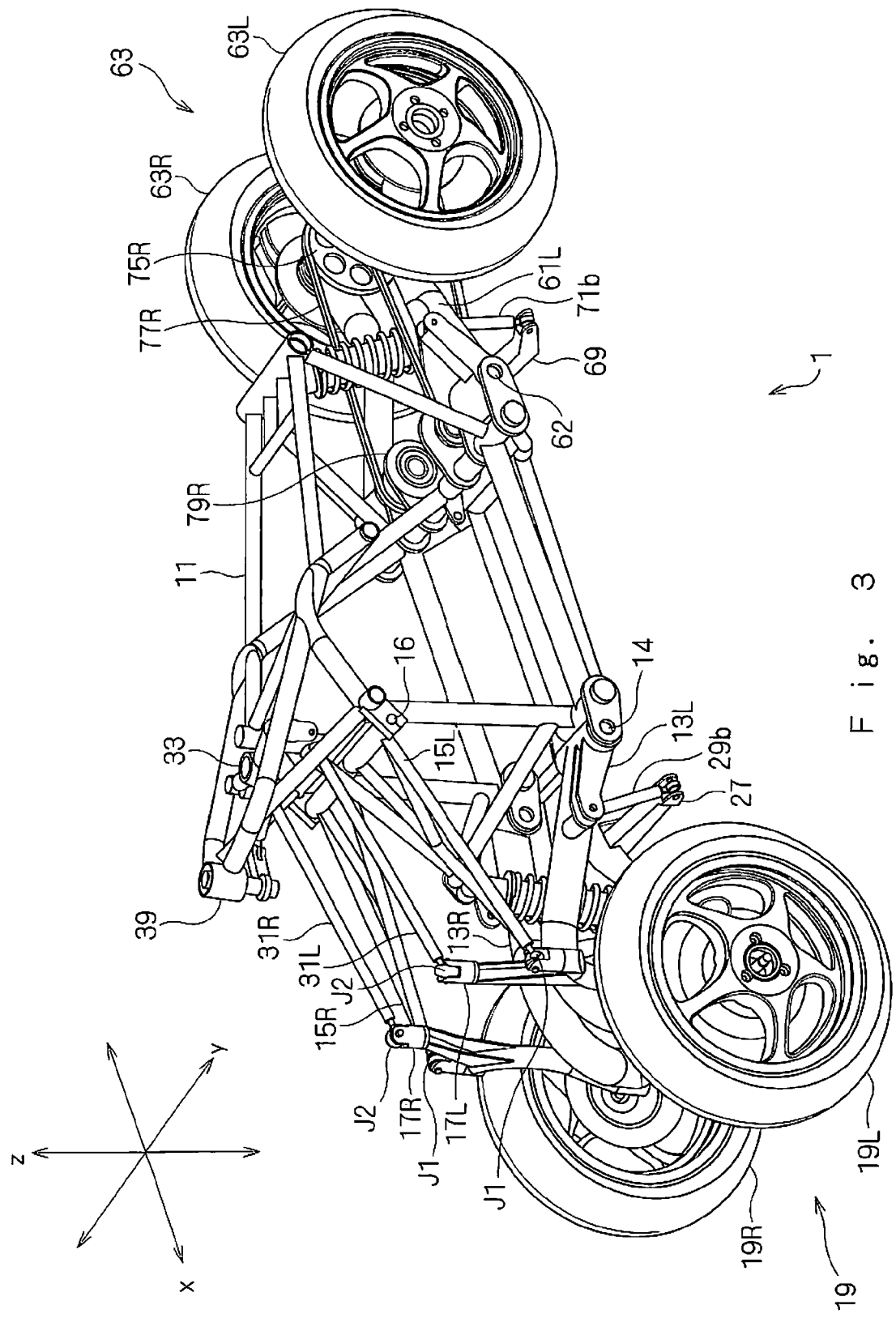
FIG. 3 is a perspective view showing an outline construction of the saddle riding type vehicle according to a preferred embodiment of the present invention.
Figure 4:
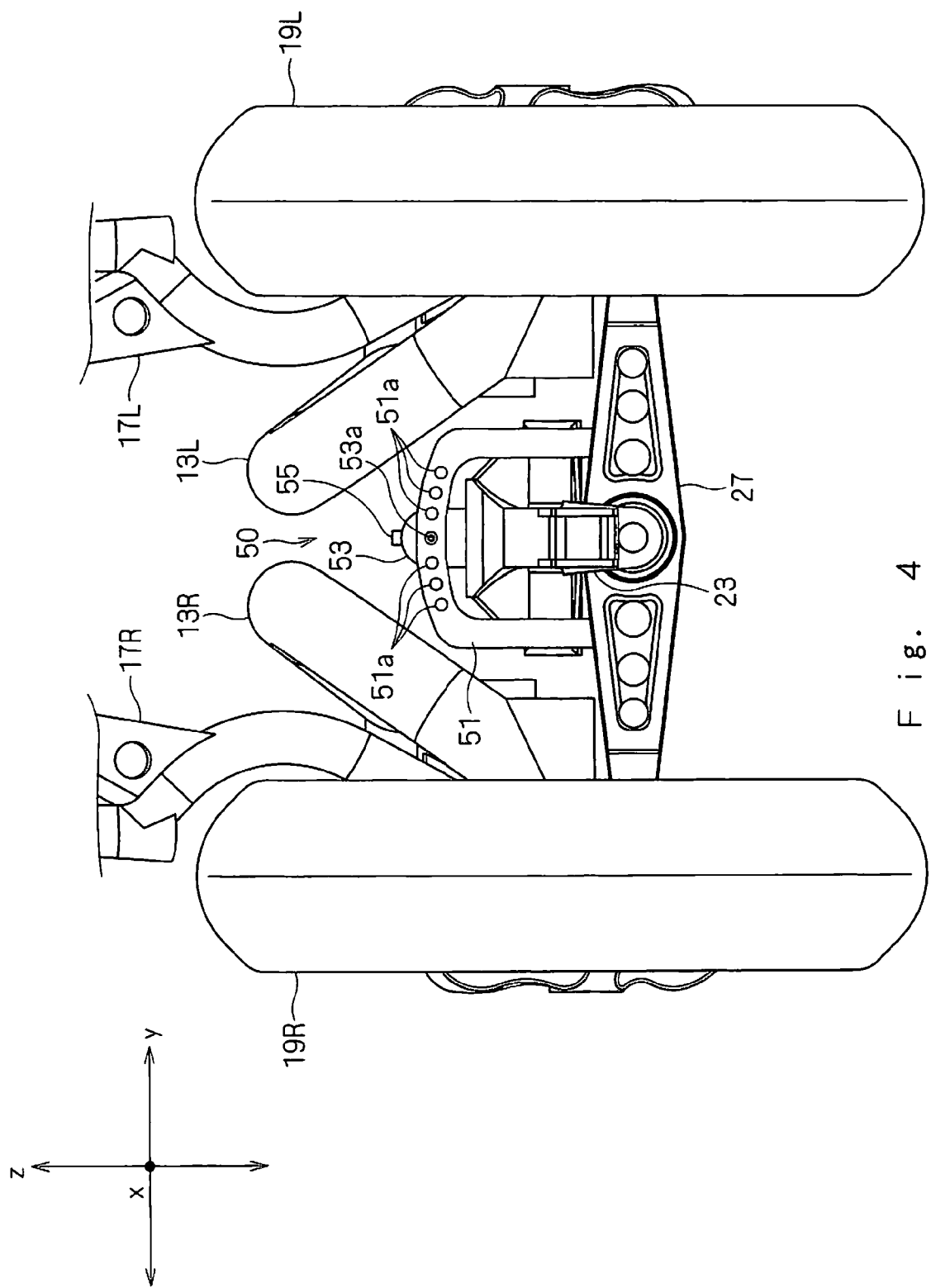
FIG. 4 is a front view of a principal portion showing a lock mechanism.
Figure 5:
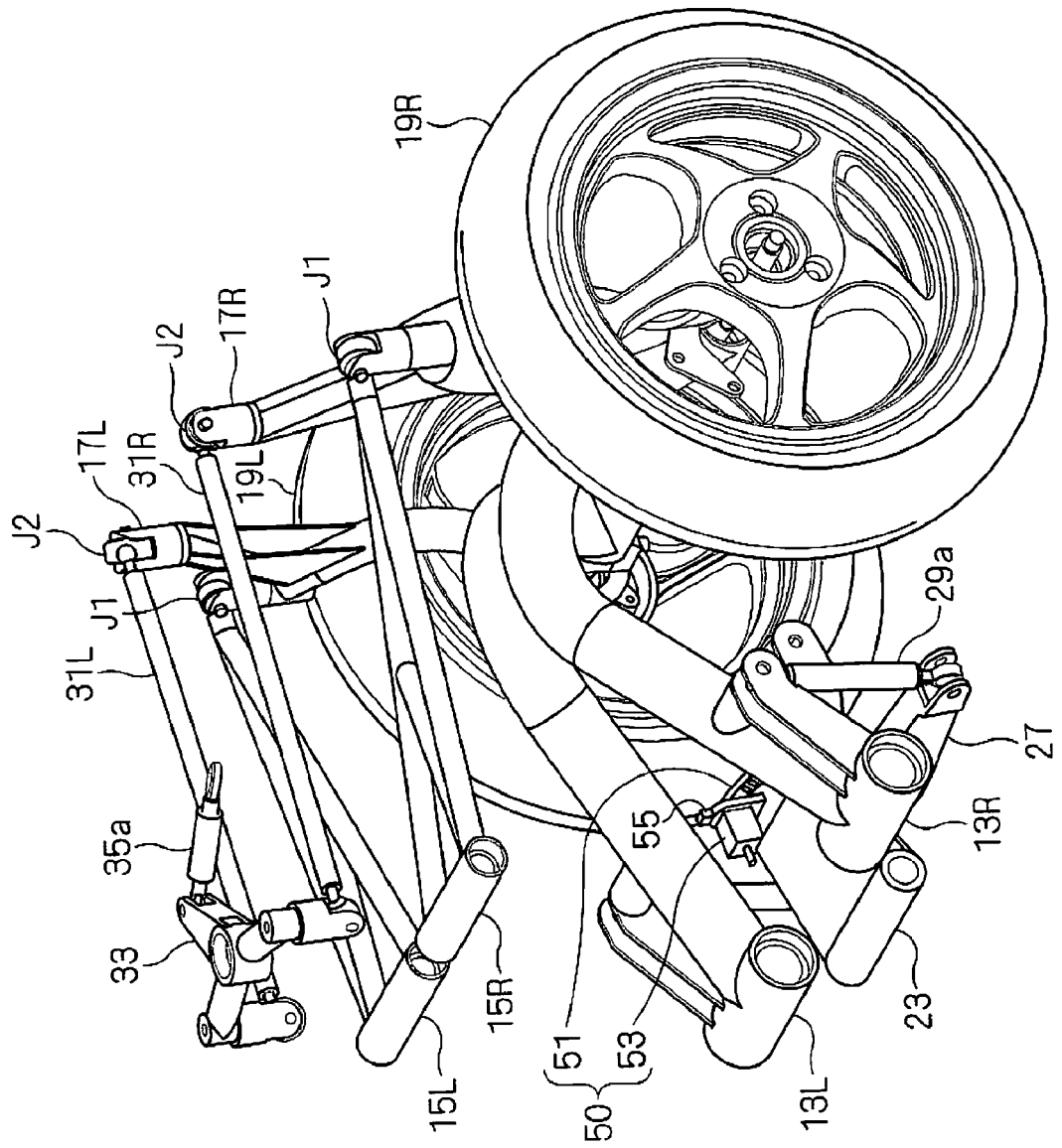
FIG. 5 is a perspective view of the principal portion showing the lock mechanism.
Figure 5:
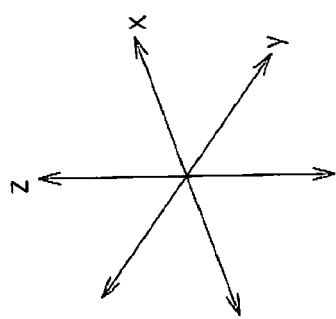

FIG. 1 is a side view showing an outward appearance of the saddle riding type vehicle according to the present invention. FIG. 2 is a side view showing an outline construction of the saddle riding type vehicle. FIG. 3 is a perspective view showing an outline construction of the saddle riding type vehicle. FIG. 4 is a front view of a principal portion showing a lock mechanism. FIG. 5 is a perspective view of the principal portion showing the lock mechanism. In the following description, the "right" and "left" refer to the sides seen from the rider seated on the saddle riding type vehicle. In FIGS. 1 and 2, the right side of the drawings corresponds to the front of the saddle riding type vehicle 1. In FIG. 3, the left side of the drawing corresponds to the front of the saddle riding type vehicle 1.

Referring mainly to FIG. 1, the saddle riding type vehicle 1 in this preferred embodiment is an automotive four-wheeled vehicle having pairs of wheels at the front and rear of a vehicle body, respectively. The saddle riding type vehicle 1 has a main frame 11 with a down tube and a seat frame. The main frame 11 includes a head pipe 39 attached to a forward end thereof. The head pipe 39 rotatably supports a steering shaft 37. A handlebar 41 is attached to the upper end of the steering shaft 37. A fuel tank 3 is mounted on the main frame 11 rearward of the handlebar 41, and a seat 4 is mounted in a further rearward position. An engine 5 is mounted on the main frame 11 below the fuel tank 3.

In the following description, this main frame 11 and components (e.g., the seat 4) rigidly secured to the main frame 11 will be referred to as a "vehicle body" where appropriate. In the drawings, the x-direction is the longitudinal direction of the vehicle body, the y-direction is the transverse direction of the vehicle body, and the z-direction is the up-and-down direction of the vehicle body. The longitudinal direction, transverse direction and up-and-down direction of the vehicle body are perpendicular to one another. When the vehicle body stands upright, the longitudinal direction and transverse direction of the vehicle body are horizontal, respectively, and the up-and-down direction of the vehicle body is vertical.

Construction Relating to the Front Wheels

1. Support Mechanisms—Right Side and Left Side Support Mechanisms

Referring to FIG. 3, the main frame 11 has, attached to lower front positions thereof, a lower right swing arm 13R and a lower left swing arm 13L arranged transversely and extending forward of the vehicle body. Similarly, the main frame 11 has, attached to upper front positions thereof, an upper right swing arm 15R and an upper left swing arm 15L arranged transversely and extending forward of the vehicle body. One end of each of the lower right swing arm 13R and lower left swing arm 13L is supported by the main frame 11 to be rotatable about a lower pivot shaft 14. One end of each of the upper right swing arm 15R and lower left swing arm 15L is supported by the main frame 11 to be rotatable about an upper pivot shaft 16. The lower and upper pivot shafts 14 and 16 extend substantially parallel to the transverse direction, respectively.

A right front tube 17R is connected to the other end of the lower right swing arm 13R. The right front tube 17R extends obliquely upward, and is in a substantially middle position thereof connected to the other end of the upper right swing arm 15R. A right wheel 19R is rotatably supported by a lower portion of the right front tube 17R. The construction is selected and designed such that joints at which the right front tube 17R is connected to the lower right swing arm 13R and upper right swing arm 15R, respectively, and positions of the lower pivot shaft 14 and upper pivot shaft 16, substantially correspond to the vertexes of a parallelogram in side view.

With the lower right swing arm 13R and upper right swing arm 15R rotating in forward and reverse directions about the lower pivot shaft 14 and upper pivot shaft 16, respectively, the right front tube 17R moves substantially up and down along the vehicle body. Consequently, the right wheel 19R moves up and down relative to the vehicle body.

A left front tube 17L and a left wheel 19L are constructed similarly to the right front tube 17R and right wheel 19R. The right wheel 19R and left wheel 19L arranged at opposite sides of the vehicle body as described above will be called collectively herein after the "right and left wheels 19" or the "pair of wheels" where appropriate.

Figure 6:
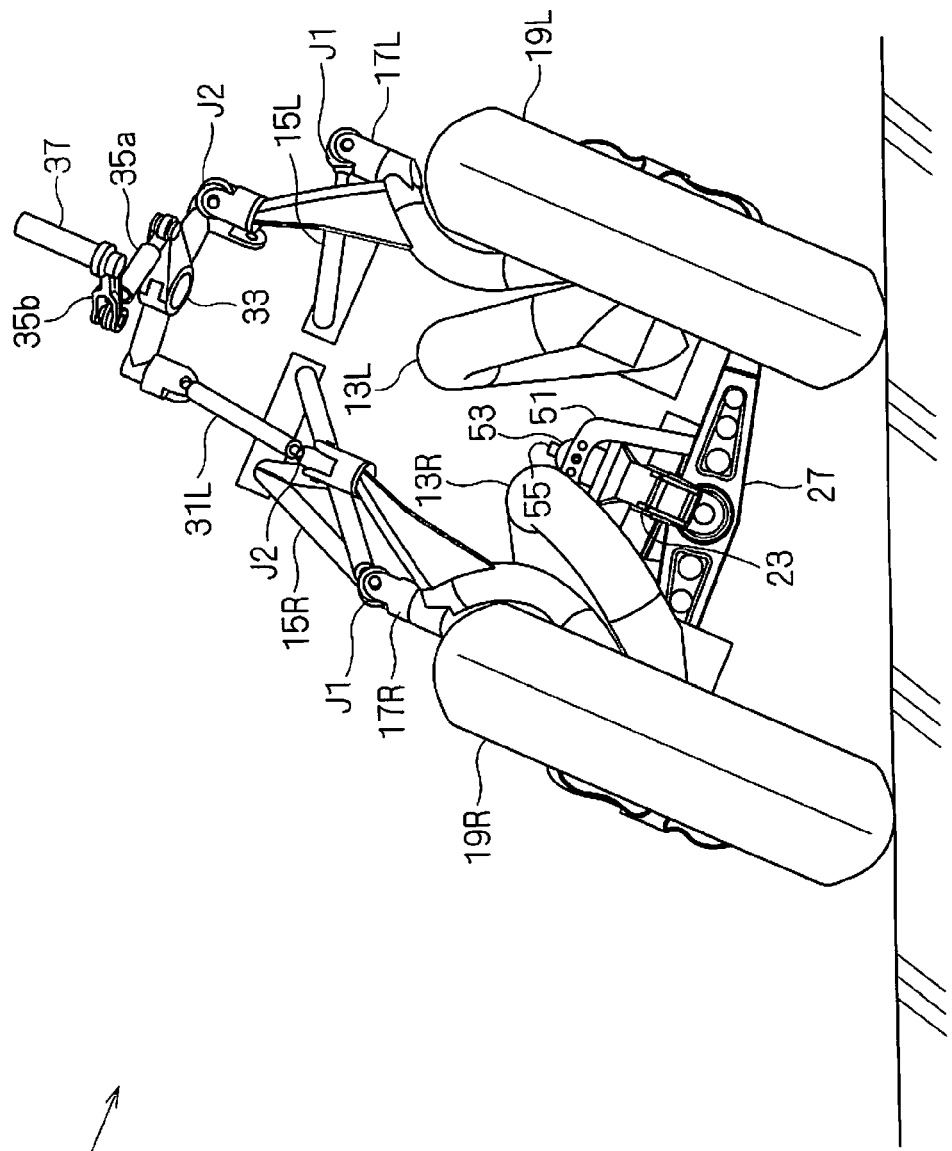
FIG. 6 is a front view of the principal portion showing a leaning state of the saddle riding type vehicle.
Figure 6:
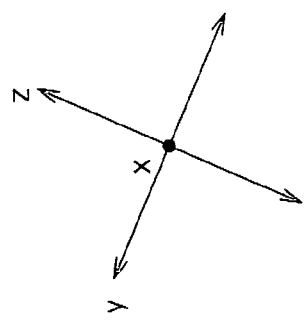
Figure 7:
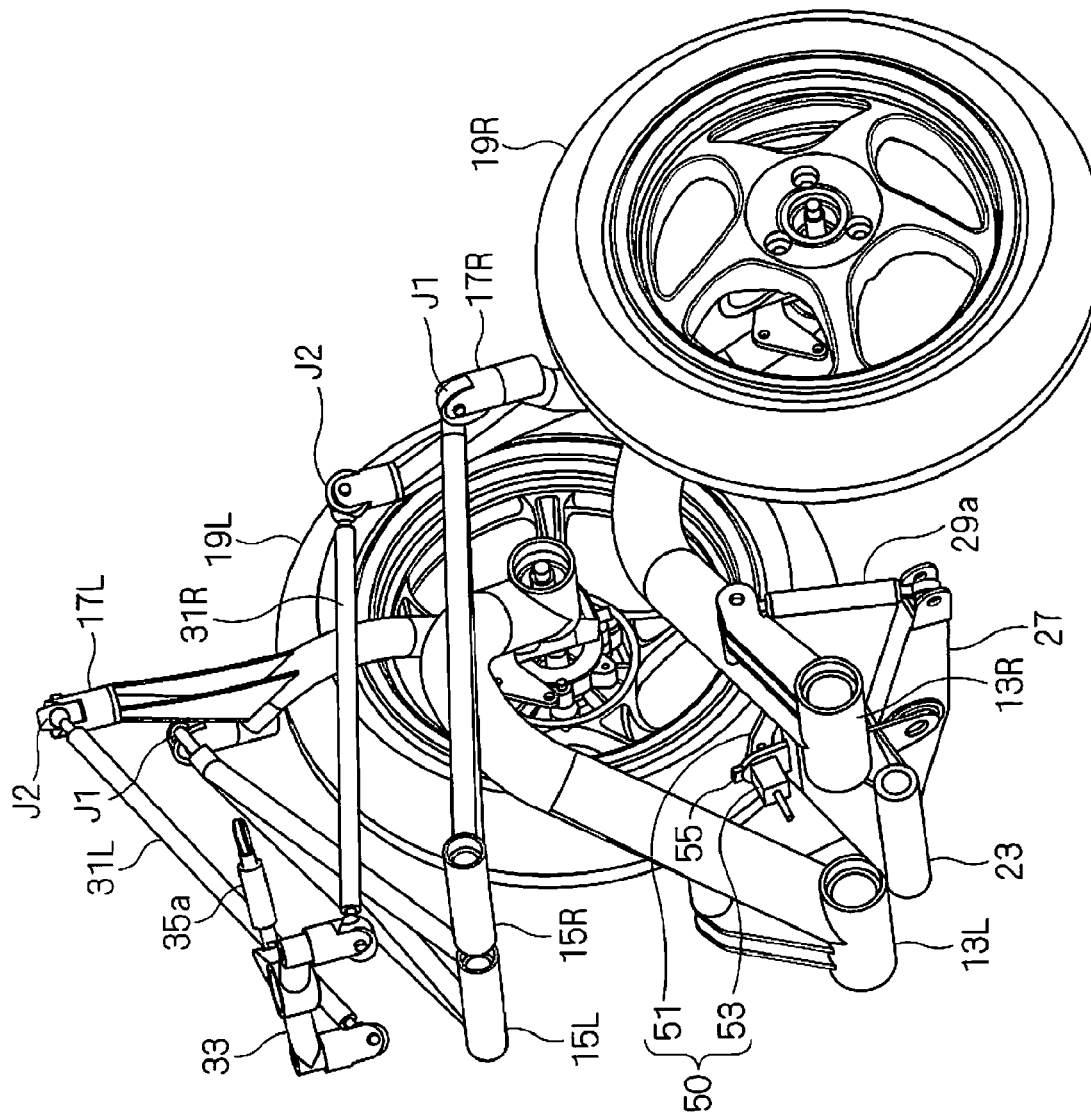
FIG. 7 is a perspective view of the principal portion showing the leaning state of the saddle riding type vehicle.
Figure 7:
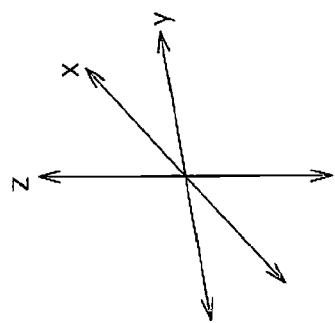

FIG. 6 is a front view of the principal portion showing a leaning state of the saddle riding type vehicle 1. FIG. 7 is a perspective view of the principal portion showing the leaning state of the saddle riding type vehicle 1. As shown, when the saddle riding type vehicle 1 is leaned to the left side in a traveling direction relative to a flat road surface, the left wheel 19L rises relative to the vehicle body, and the right wheel 19R lowers relative to the vehicle body, whereby the right and left wheels 19 are maintained in contact with the road surface. With a forward movement in this state (onward from the plane of FIG. 6), the saddle riding type vehicle 1 will turn left (rightward in FIG. 6).

The lower right swing arm 13R, upper right swing arm 15R and right front tube 17R correspond to the right side support mechanism in the present preferred embodiment. The lower left swing arm 13L, upper left swing arm 15L and left front tube 17L correspond to the left side support mechanism in the present preferred embodiment.

2. Support Mechanism—Balancer Mechanism

Referring mainly to FIG. 4, between and slightly below the lower right swing arm 13R and lower left swing arm 13L, a front carrier beam 23 is integrally supported by the main frame 11 to extend forward of the vehicle body. The front carrier beam 23 is further connected through a front suspension 25 to a central portion at the forward end of the main frame 11. The front carrier beam 23 supports a front balancer beam 27 to be rotatable about a shaft (herein after referred to as the "rotary shaft" where appropriate) extending substantially longitudinally of the vehicle body. As shown in FIG. 5, the front balancer beam 27 extends transversely of the vehicle body, and has lower ends of rods 29a and 29b pivotably connected to opposite ends thereof. The upper ends of the rods 29a and 29b are pivotably connected to substantially middle positions of the lower right swing arm 13R and lower left swing arm 13L, respectively.

When, for example, the lower right swing arm 13R rotates about the lower pivot shaft 14 to lower the right wheel 19R and depresses the rod 29a, the front balancer beam 27 rotates to raise the other rod 29b and push up the lower left swing arm 13L. As a result, the left wheel 19L moves up by an amount corresponding to the descent of the right wheel 19R. Thus, the right wheel 19R and left wheel 19L move up and down in equal amounts in substantially opposite directions relative to the vehicle body.

The front carrier beam 23, front suspension 25, front balancer beam 27 and rods 29a and 29b correspond to the balancer mechanism in the present preferred embodiment. The right side support mechanism, left side support mechanism and balancer mechanism associated with the right and left wheels 19 at the front of the vehicle body noted above correspond to the support mechanism in the present preferred embodiment.

3. Steering Mechanism

Referring to FIGS. 5 and 7, a ball joint J1 is preferably used as each of the joint between the right front tube 17R and lower right swing arm 13R and the joint between the right front tube 17R and upper right swing arm 15R. The ball joint J1 coupling the right front tube 17R and lower right swing arm 13R is not shown in FIG. 7. Thus, the right front tube 17R is supported by the lower right swing arm 13R and upper right swing arm 15R to be rotatable about an axis extending through the upper and lower joints.

Further, the right front tube 17R has a right steering rod 31R interlocked thereto. The right steering rod 31R is connected to the upper end of the right front tube 17R, which is offset from the axis extending through the joints noted above. A ball joint J2 is preferably used as the joint between the right front tube 17R and right steering rod 31R. The left front tube 17L and a left steering rod 31L interlocked thereto are arranged similarly to the above.

The other ends of the right steering rod 31R and left steering rod 31L are connected to a front bar 33, respectively. The front bar 33 has a central portion supported by the main frame 11 to be rotatable about an axis extending substantially vertically of the vehicle body, and two arms extending from this central portion substantially transversely of the vehicle body. The other ends of the right steering rod 31R and left steering rod 31L are connected to distal ends of these arms, respectively.

The front bar 33 further includes one arm extending from the central portion obliquely forward of the vehicle body. This arm is connected to the lower end of the steering shaft 37 through link members 35a and 35b. The steering shaft 37 extends through, and rotatably supported, by the head pipe 39 provided in an uppermost position at the forward end of the main frame 11. The handlebar 41 is fixed to the upper end of the steering shaft 37. The handlebar 41 includes an accelerator grip 42.

When the handlebar 41 is turned, the link members 35a and 35b will bend and stretch to rotate the front bar 33. As a result, the right steering rod 31R and left steering rod 31L move in opposite directions substantially longitudinally of the vehicle body. The right front tube 17R and left front tube 17L rotate to give a steering angle to the right wheel 19R and left wheel 19L.

4. Lock Mechanism

Reference is made to FIGS. 3 and 4. A lock mechanism 50 includes a disk 51 and a solenoid 53. The disk 51 is a gate-shaped plate that is preferably integral with the front balancer beam 27. The disk 51 has a plurality of smallbores 51a formed therein and arranged circumferentially about the rotary shaft of the front balancer beam 27.

The solenoid 53 is preferably integral with the front carrier beam 23, in a position that can be opposed to one of the small bores 51a even when the front balancer beam 27 rotates. The solenoid 53 has a movable portion 53a that is arranged to extend and contract into and out of engagement with the small bores 51a. The positions for expansion and contraction of the movable portion 53a are controlled by electrification of the solenoid 53.

The movable portion 53a connected to one of the small bores 51a limits rotation of the front balancer beam 27 relative to the front carrier beam 23 (that is, the main frame 11). As a result, a further rotation of the lower right swing arm 13R and lower left swing arm 13L about the lower pivot shafts 14 becomes impossible, thereby to limit the up-and-down motion of the right and left wheels 19. On the other hand, when the movable portion 53a disengages from the small bore 51a, the front balancer beam 27 becomes rotatable relative to the front carrier beam 23 (that is, the main frame 11). As a result, the lower right swing arm 13R and lower left swing arm 13L become rotatable about the lower pivot shafts 14, thereby canceling the lean limitation of the up-and-down motion of the right and left wheels 19.

The construction of the lock mechanism 50 is not limited to that which includes the solenoid 53 described above. For example, the lock mechanism 50 may be changed to replace the solenoid 53 with a pad for pinching the disk 51 and a motor for driving the pad. However, the lock mechanism 50 including the solenoid 53 has a better response than the lock mechanism including the pad and motor. Specifically, the response of the lock mechanism 50 is about 20 ms, for example, while that of the lock mechanism including the pad and motor is about one second. The disk 51 corresponds to the connector in the present preferred embodiment. The lock mechanism 50 corresponds to the lean limiting mechanism in the present preferred embodiment.

5. Operation Detector

Figure 8:
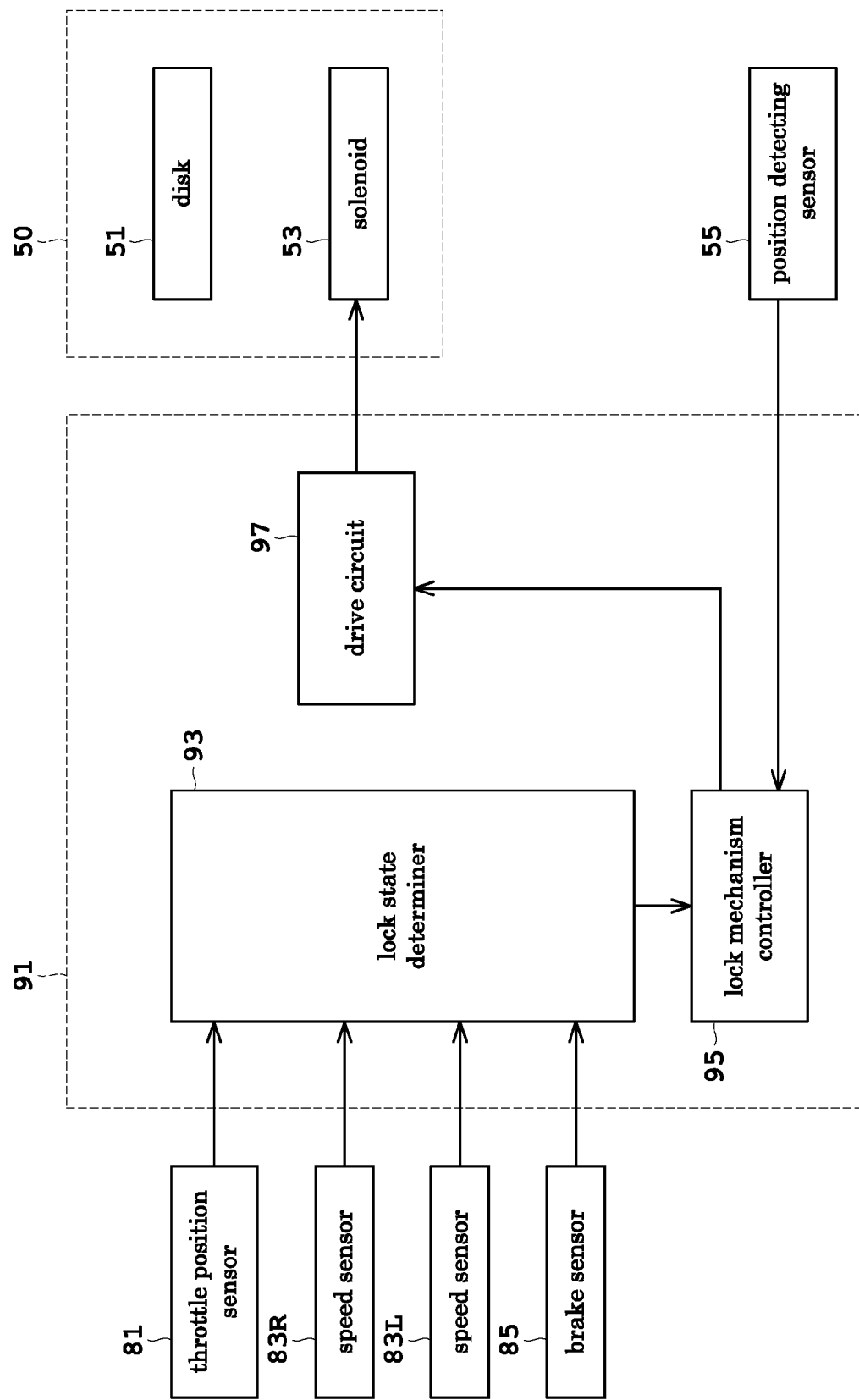
FIG. 8 is a block diagram showing an outline construction of a control system provided for the saddle riding type vehicle.

The solenoid 53 has a position detecting sensor 55 attached thereto for detecting positions of the movable portion 53a (see FIG. 8). This position detecting sensor 55 enables determination whether the movable portion 53a is connected to or disconnected from one of the small bores 51a. The position detecting sensor 55 may be formed of a hole IC or potentiometer, for example. The position detecting sensor 55 corresponds to the operation detector in the present preferred embodiment.

Construction Relating to the Rear Wheels

1. Support Mechanisms—Right Side and Left Side Support Mechanisms

Reference is made to FIGS. 2 and 3. The main frame 11 has, attached to lower rear positions thereof, a right rear swing arm 61R and a left rear swing arm 61L arranged transversely and extending rearward of the vehicle body. The right rear swing arm 61R and left rear swing arm 61L are supported by the main frame 11 to be rotatable about rear pivot shafts 62, respectively. The right rear swing arm 61R has, rotatably supported at a rear end thereof, a drive shaft (not shown) extending transversely of the vehicle body. A right wheel 63R is connected to the drive shaft.

With the right rear swing arm 61R rotating in opposite directions about the rear pivot shaft 62, the right wheel 63R moves up and down relative to the vehicle body. The construction of the support mechanism relating to the left rear swing arm 61L (a drive shaft and a left wheel 63L) is similar to that of the right rear swing arm 61R.

In the following description, the right wheel 63R and left wheel 63L arranged at opposite sides of the vehicle body will be collectively called the "right and left wheels 63" or the "pair of wheels" where appropriate. The right rear swing arm 61R and left rear swing arm 61L correspond to the right support mechanism and left support mechanism in the present preferred embodiment, respectively.

2. Support Mechanism—Balancer Mechanism

Referring to FIG. 2, between the right rear swing arm 61R and left rear swing arm 61L, a rear carrier beam 65 is integrally supported by the main frame 11 to extend rearward of the vehicle body. The rear carrier beam 65 is further connected through a rear suspension 67 to an upper portion at the rear end of the main frame 11.

The rear carrier beam 65 supports a rear balancer beam 69 to be rotatable about a shaft (herein after referred to as the "rotary shaft" where appropriate) extending substantially longitudinally of the vehicle body. The rear balancer beam 69 extends transversely of the vehicle body, and has lower ends of rods 71a and 71b pivotably connected to opposite ends thereof. The upper ends of the rods 71a and 71b are interlocked to substantially middle positions of the right rear swing arm 61R and left rear swing arm 61L, respectively.

When, for example, the right rear swing arm 61R rotates relative to the main frame 11 to lower the right wheel 63R and depress the rod 71a, the rear balancer beam 69 rotates to raise the other rod 71b. As a result, the left rear swing arm 61L is pushed up, and the left wheel 63L moves up by an amount corresponding to the descent of the right wheel 63R. Thus, the right wheel 63R and left wheel 63L move up and down in substantially opposite directions relative to the vehicle body.

The rear carrier beam 65, rear suspension 67, rear balancer beam 69 and rods 71a and 71b correspond to the balancer mechanism in the present preferred embodiment. The above-noted right side support mechanism and left side support mechanism corresponding to the right and left rear wheels 63 and the balancer mechanism correspond to the support mechanism in the present preferred embodiment.

3. Drive Mechanism

Reference is made to FIG. 3. A driven sprocket 75R is connected to the drive shaft rotatably supported by the right rear swing arm 61R. A chain 77R is wound around the driven sprocket 75R. The chain 77R is further wound around a drive sprocket 79R. The driving force of the engine 5 (see FIG. 1) is transmitted to the drive sprocket 79R.

The drive sprocket 79R is rotated by the driving force of the engine 5 transmitted thereto, to rotate the driven sprocket 75R through the chain 77R. As a result, the drive shaft and right wheel 63R rotate with the driven sprocket 75R.

The construction of the drive mechanism (the driven sprocket, chain and drive sprocket (with the signs omitted from FIG. 3 for expediency of illustration)) relating to the left rear swing arm 61L is the same as that of the right rear swing arm 61R.

State Detector

The saddle riding type vehicle 1 includes a throttle position sensor 81 for detecting throttle opening, speed sensors 83R and 83L for detecting vehicle speed, and a brake sensor 85 arranged to detect a brake operation (see FIG. 8, and the throttle position sensor 81 is shown also in FIG. 1).

The "throttle opening" detected by the throttle position sensor 81 is the opening of a throttle valve provided on an engine inlet pipe. The "vehicle speed" detected by the speed sensor 83R is a speed of the right wheel 19R, while the "vehicle speed" detected by the speed sensor 83L is a speed of the left wheel 19L. The brake operation detected by the brake sensor 85 is whether a brake lever attached to the handlebar 41 is operated by the rider.

The throttle position sensor 81 corresponds to the throttle position detector in the present preferred embodiment. The speed sensors 83R and 83L correspond to the vehicle speed detector in the present preferred embodiment. The brake sensor 85 corresponds to the brake detector in the present preferred embodiment.

Controller

FIG. 8 is a block diagram showing an outline construction of a control system provided for the saddle riding type vehicle 1. A controller 91 includes a lock state determiner 93, a lock mechanism controller 95 and a drive circuit 97. The controller 91 is preferably realized by a central processing unit (CPU) for performing various processes and a storage medium, or a microcomputer. The storage medium stores in advance threshold values for comparison with detection results of vehicles states (first to fourth speeds v1-v4, and first and second openings oa1 and oa2), for example.

The lock state determiner 93 receives detection results from the throttle position sensor 81, speed sensors 83R and 83L and brake sensor 85. The detection result from the throttle position sensor 81 is a value normalized by considering an idling time to be 0%, and a full throttle time to be 100%. The detection results from the speed sensors 83R and 83L are values converted to speed per hour (km/h), for example. The detection result from the brake sensor 85 is information indicating, for example, "ON" when the right and left wheels 63 are braked, and "OFF" when the brakes are not applied.

The lock state determiner 93 opts for the lean limitation by the lock mechanism 50 or its cancellation based on detection results provided. When a determination is made, the determination information is provided to the lock mechanism controller 95.

The lock mechanism controller 95 outputs a PWM signal for moving the movable portion 53a to a position according to the determination information. The lock mechanism controller 95 receives also the detection result from the position detecting sensor 55. The lock mechanism controller 95 checks by comparison whether a position obtained from the detection result of the position detecting sensor 55 agrees with the position according to the determination information. When the positions are in agreement, the lock mechanism 50 is determined to be operating normally. When not in agreement, the lock mechanism 50 is determined not to be operating normally. When the lock mechanism 50 is determined not to be operating normally, the lock mechanism controller 95 outputs a PWM signal again for moving the movable portion 53a to the position according to the determination information.

The drive circuit 97 receives the PWM signal from the lock mechanism controller 95. The drive circuit 97 outputs a current according to the PWM signal to the solenoid 53.

Next, an example of control of the lock mechanism 50 in this preferred embodiment and an example of operation of the saddle riding type vehicle 1 in relation to the control will be described. Description will be made separately of the lean limitation by the lock mechanism and of its cancellation.

Operation for Lean Limitation by Lock Mechanism

The lock state determiner 93 determines whether the vehicle is in at least one of state A and state B, based on the detection results from the throttle position sensor 81, speed sensors 83R and 83L and brake sensor 85. This determination may be made using maps stored beforehand in the controller 91, or through a series of determination flows. When the vehicle is found in at least one of state A and state B as a result, the lock state determiner 93 opts for causing the lock mechanism 50 to limit up-and-down motion of the right and left wheels 19, that is to lock leaning (lean limitation) of the vehicle. When the vehicle is neither in state A nor in state B, the lock state determiner 93 does not opt for the lean lamination by the lock mechanism 50.

Figure 9A:
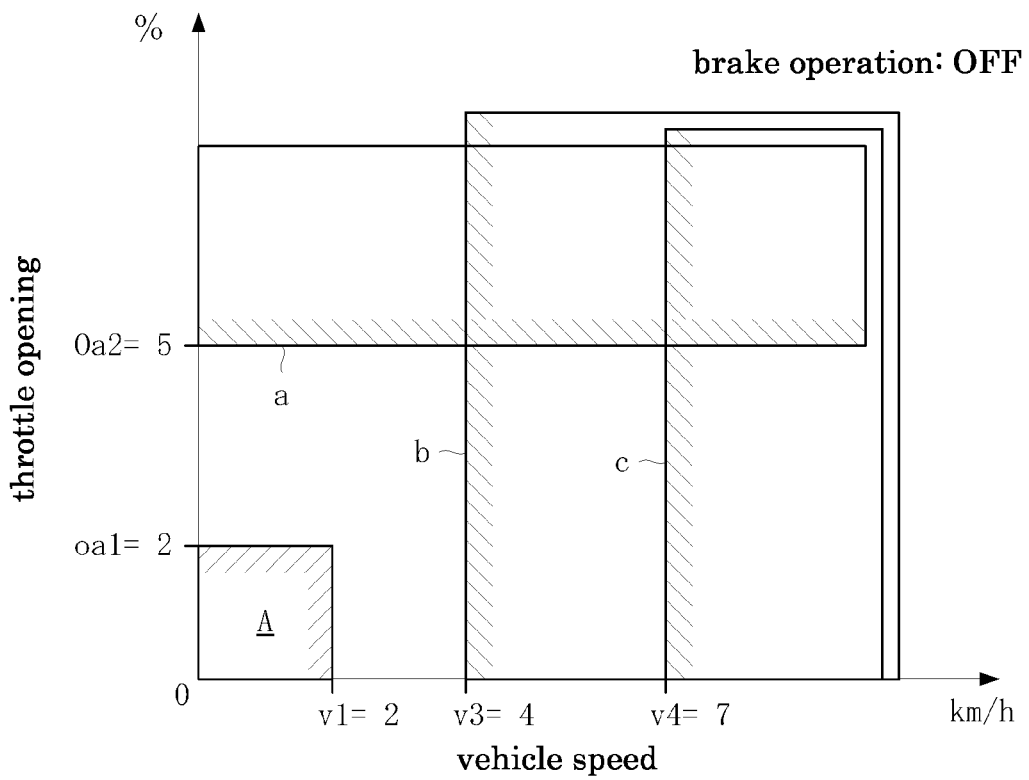
FIG. 9A is a view schematically showing areas of states A, B, a, b, and c for locking leaning of the vehicle when a brake operation is "OFF".
Figure 9B:
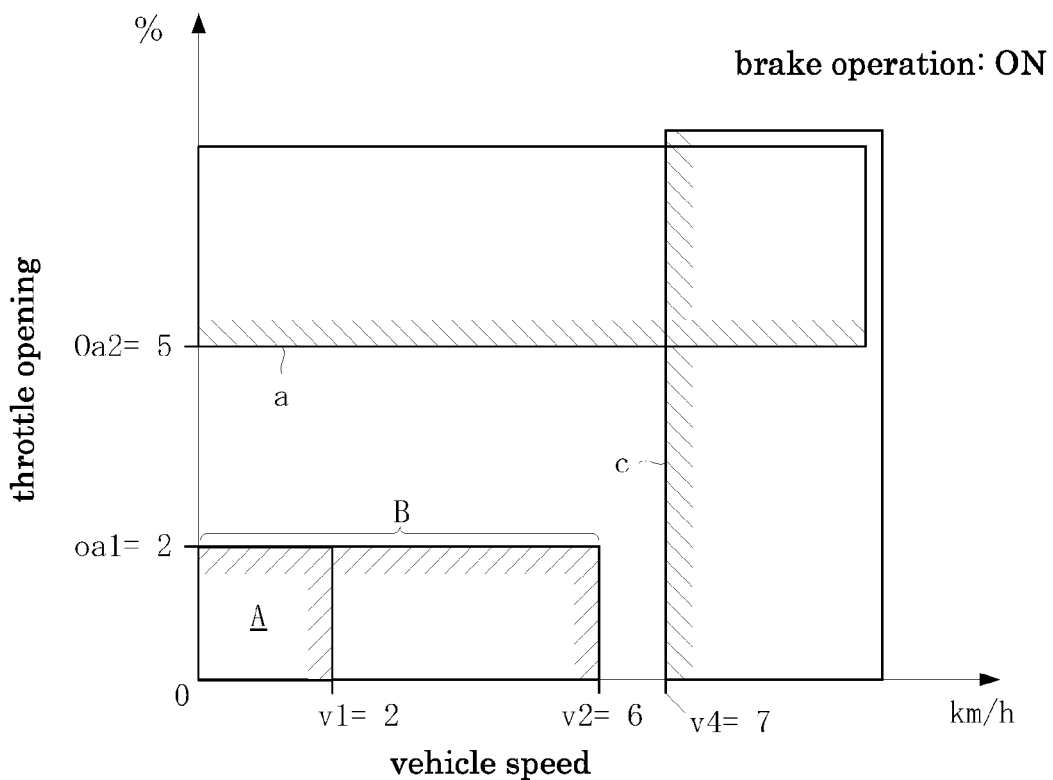
FIG. 9B is a view schematically showing areas of states A, B, a, b, and c for locking leaning of the vehicle when a brake operation is "ON".

State A and state B will be described specifically with reference to FIGS. 9A and 9B. FIGS. 9A and 9B are views schematically showing areas of state A and state B for locking leaning of the vehicle. The areas shown in FIGS. 9A and 9B are stored as maps in the storage medium of the controller 91. In each of FIGS. 9A and 9B, the vertical axis represents throttle opening (%), and the horizontal axis vehicle speed (km/h). FIG. 9A shows a case where a brake operation is not carried out (i.e. a brake operation is "OFF"). FIG. 9B shows a case where a brake operation is carried out (i.e. a brake operation is "ON"). State a, state b and state c shown in FIGS. 9A and 9B will be described herein after.

As shown, state A is a vehicle state in which vehicle speed is a first speed v1 or less, and throttle opening is a first opening oa1 or less. State B is a vehicle state in which vehicle speed is a second speed v2 or less, throttle opening is the first opening oa1 or less, and a brake operation is "ON".

The values of the above first speed v1, second speed v2 and first opening oa1 are set beforehand. The value of the second speed v2 is set larger than that of the first speed v1. The lock state determiner 93 makes a determination using the higher of the vehicle speeds detected by the speed sensors 83R and 83L.

State A and state B overlap each other. The overlapping portion corresponds to a vehicle state in which vehicle speed is the first speed v1 or less, throttle opening is the first opening oa1 or less, and a brake operation is "ON".

When actually stopping the running vehicle, the throttle valve is closed first (the throttle opening being reduced to substantially 0%) to start deceleration through braking with the engine. A brake operation may be carried out eventually, or may be withheld to the last. A brake operation is withheld, for example, in a situation where vehicle speed has fallen to an extremely slow level as in congested traffic, or in a situation where vehicle speed falls sufficiently only by closing throttle opening as on an uphill road.

Taking this into consideration, state A is specified as noted above in order to operate the lock mechanism 50 also when stopping the vehicle without carrying out a brake operation. When a brake operation is carried out, the rider's intention "to stop" is manifest. Thus, the second speed v2 is set faster than the first speed v1, so that the lock mechanism 50 may be operated in a large speed range compared with state A.

The throttle opening is the same for states A and B. In order to render the lock mechanism 50 inoperable when the rider opens the throttle valve, the throttle opening larger than the first opening oa1 (2%) is included in neither of states A and B.

FIGS. 9A and 9B show an example of each value of the first opening oa1, first speed v1 and second speed v2 which define state A and state B. The first opening oa1 is about 2%, for example. The first speed v1 is about 2 km/h, and the second speed v2 is about 6 km/h, for example. The throttle opening of about 2% is an opening substantially corresponding to an idling state. The speed about 2 km/h corresponds to a vehicle speed just before stopping.

State A and state B include the following traveling scenes. State B includes a case where the throttle valve is closed (throttle opening: about 2% or less), a brake operation is carried out (brake operation: ON) and vehicle speed falls to about 6 km/h or less. Further, both states A and B include a case where vehicle speed becomes about 2 km/h or less, with the throttle valve remaining closed.

When the lean limitation by the lock mechanism 50 is off, the lock state determiner 93 can determine conveniently whether to lock leaning of the vehicle body, using the maps illustrated in FIGS. 9A and 9B. However, the determination by the lock state determiner 93 can be made without using the maps. For example, whether to lock leaning of the vehicle body may be determined through a series of determination flows as described herein after.

Figure 10:
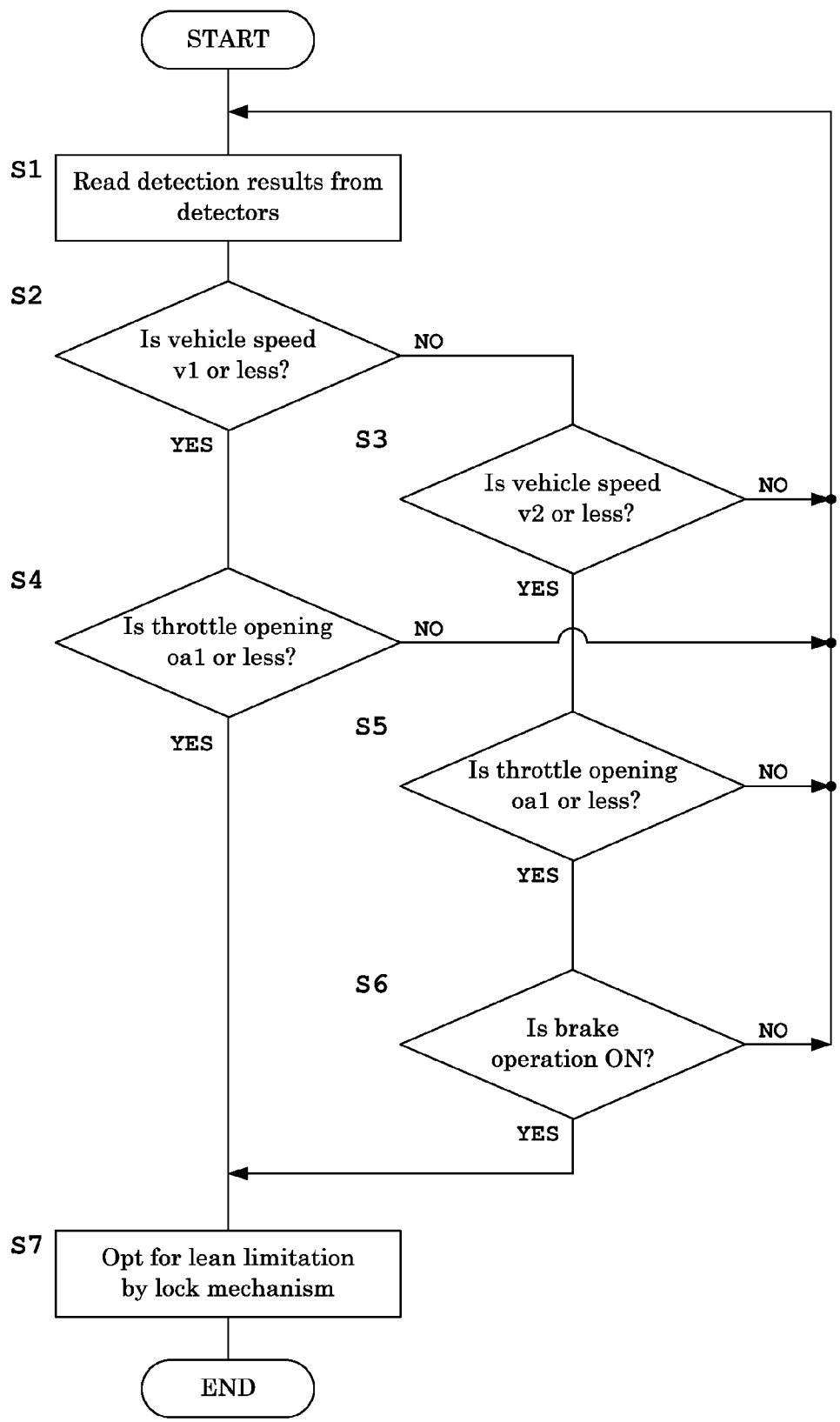
FIG. 10 is a flow chart showing an example of procedure for a lock state determiner to determine whether the vehicle is in state A or in state B.

Reference is made to FIG. 10. FIG. 10 is a flowchart showing an example of procedure for the lock state determiner 93 to determine whether the vehicle is in state A or in state B. It is assumed here that the lock mechanism 50 is not in a state of limiting up-and-down motion of the right and left wheels 19, but the lock of leaning of the vehicle body is off.

<Step S1> Read Detection Results From Detectors

The lock state determiner 93 reads detection results from the throttle position sensor 81, speed sensors 83R and 83L and brake sensor 85 at regular intervals of time. The lock state determiner 93 selects the higher of the vehicle speeds detected by the speed sensors 83R and 83L. In the following description, the selected vehicle speed will be referred to simply as "vehicle speed".

<Step S2> Is Vehicle Speed v1 or Less?

The lock state determiner 93 determines whether vehicle speed is equal to or less than the first speed v1. When the result shows a vehicle speed equal to or less than the first speed v1, the operation proceeds to step S4. Otherwise, the operation proceeds to step S3.

<Step S3> Is Vehicle Speed v2 or Less?

The lock state determiner 93 determines whether vehicle speed is equal to or less than the second speed v2. When the result shows a vehicle speed equal to or less than the second speed v2, the operation proceeds to step S5. Otherwise, the operation returns to step S1.

<Step S4> Is Throttle Opening oa1 or Less?

The lock state determiner 93 determines whether throttle opening is equal to or smaller than the first opening oa1. When the result shows a throttle opening equal to or smaller than the first opening oa1, the operation proceeds to step S7. Otherwise, the operation returns to step S1.

<Step S5> Is Throttle Opening oa1 or Less?

The lock state determiner 93 makes the same determination as in step S4. When the result shows a throttle opening equal to or smaller than the first opening oa1, the operation proceeds to step S6. Otherwise, the operation returns to step S1.

<Step S6> Is Brake Operation ON?

The lock state determiner 93 determines whether a brake operation is ON. When the result shows that a brake operation is ON, the operation proceeds to step S7. Otherwise, the operation returns to step S1.

<Step S7> Opt for Lean Limitation By Lock Mechanism

The lock state determiner 93 opts for causing the lock mechanism 50 to limit up-and-down motion of the right and left wheels 19.

This procedure does not determine whether the vehicle is in state A or state B. That is, if the vehicle is in state A, it will always be determined in step S4 that the throttle opening is equal to or smaller than the first opening oa1. However, when the throttle opening is determined in step S4 to be equal to or smaller than the first opening oa1, the vehicle may be in state A, but may also be in state B. If it is determined in step S6 that a brake operation is ON, the vehicle will certainly be in state B. However, when the vehicle is in state B, it is not necessarily determined in step S6 that a brake operation is ON.

However, when the vehicle is either in state A or in state B, throttle opening is always determined in step S4 to be equal to or smaller than the first opening oa1, or it is determined in step S6 that a brake operation is ON. With such procedure, the lock state determiner 93 can determine conveniently whether the vehicle is either in state A or in state B.

When the lock state determiner 93 opts for the lean limitation by the lock mechanism 50 as described above, it gives the determination information to the lock mechanism controller 95. The lock mechanism controller 95 outputs a PWM signal to the drive circuit 97 for moving (advancing) the movable portion 53a to a predetermined position. The drive circuit 97 supplies the solenoid 53 with a current according to the PWM signal to move the movable portion 53a.

At this time, the lock mechanism controller 95 determines based on the detection result from the position detecting sensor 55 whether the movable portion 53a is connected to one of the small bores 51a (i.e. whether it has operated normally or not). When it is determined that the movable portion 53a has operated normally, the operation control of the lock mechanism 50 is completed. When it is determined that the movable portion 53a has not operated normally, the lock mechanism controller 95 outputs a PWM signal to the drive circuit 97 again to move the movable portion 53a.

When the movable portion 53a is connected to one of the small bores 51a, the up-and-down motion of the right and left wheels 19 is limited. The up-and-down motion of the right and left wheels 63 also is limited. When vehicle speed becomes zero while the lean limitation by the lock mechanism 50 is in place, the vehicle can sustain itself without the rider's feet touching the ground.

Thus, the rider can stop the saddle riding type vehicle 1 comfortably, without carrying out a special manual control for operating the lock mechanism 50. When not opting for the lean limitation by the lock mechanism 50, the lean limitation by the lock mechanism 50 does not take place. Thus, the rider can drive the vehicle 1 comfortably.

Operation for Cancellation of Lean Limitation by Lock Mechanism

The lock state determiner 93 determines based on the detection results from the throttle position sensor 81, speed sensors 83R and 83L and brake sensor 85 whether the vehicle is in one of state a, state b and state c. This determination also may be made using the maps stored beforehand in the controller 91, or through a series of determination flows. When the vehicle is found in at least one of state a, state b and state c as a result, the lock state determiner 93 opts for cancellation of the lean limitation by the lock mechanism 50 to the up-and-down motion of the right and left wheels 19, that is cancellation of the lean limit. When the vehicle is not in any one of state a, state b and state c, the lock state determiner 93 does not opt for cancellation of the lean limitation by the lock mechanism 50.

Reference is made to FIGS. 9A and 9B. State a is a state where the throttle opening is equal to or larger than the second opening oa2. State b is a state where vehicle speed is equal to or higher than a third speed v3 and a brake operation is not carried out. State c is a state where vehicle speed is equal to or higher than a fourth speed v4. The second opening oa2 has a larger value set beforehand than the first opening oa1. The third opening oa3 has a value set beforehand, which is larger than the value of the first opening oa1 and smaller than the value of the second opening oa2. The fourth opening oa4 has a larger value set beforehand than the second opening oa2. The lock state determiner 93 uses the higher of the vehicle speeds detected by the speed sensors 83R and 83L. State a, state b and state c overlap one another as shown in FIGS. 9A and 9B.

When actually starting the vehicle, the throttle opening enlarges before vehicle speed increases. Taking this into consideration, state a is specified as noted above in order to cancel the lean limitation by the lock mechanism 50 when starting the vehicle.

While the vehicle is running, there may occur a case where the throttle valve is open, and a case where the throttle valve is closed. An example of the latter is a situation where the vehicle runs on a downhill road. Taking this into consideration, state c is specified only by the fourth speed v4 in order that the lean limitation by the lock mechanism 50 can be canceled in either of the former and latter cases.

Further, while the vehicle is running with the throttle valve closed, the vehicle speed may be at a level that requires a brake operation, or may be so low that a brake operation is unnecessary. State b is specified by the third speed v3 lower than the fourth speed v4, so that the lean limitation by the lock mechanism 50 can be canceled even when the vehicle speed is so low that a brake operation is unnecessary, FIGS. 9A and 9B show an example of each value of the second opening oa2, third speed v3 and fourth speed v4 which define state a, state b and state c. The second opening oa2 preferably is about 5%, for example. The third speed v3 preferably is about 4 km/h, and the fourth speed v4 preferably is about 7 km/h, for example.

The relationship between states A and B and states a, b and c specified with the above example of values is as follows. When a brake operation is OFF, state A and state B and state a, state b and state c are separated by a difference between the third speed v3 and first speed v1, and a difference between the first opening oa1 and second opening oa2. When a brake operation is ON, state A and state B and state a, state b and state c are separated by a difference between the second speed v2 and fourth speed v4, and a difference between the first opening oa1 and second opening oa2. This can avoid a frequent repetition of the lean limitation by the lock mechanism 50 and its cancellation due to switching made alternately to state A and state B and to state a, state b and state c at the time of traveling.

When the lean limitation by the lock mechanism 50 is in place, the lock state determiner 93 can determine conveniently whether to unlock leaning of the vehicle body, using the maps illustrated in FIGS. 9A and 9B. However, the determination by the lock state determiner 93 can be made without using the maps. For example, whether to unlock leaning of the vehicle body may be determined through a series of determination flows as described herein after.

Figure 11:
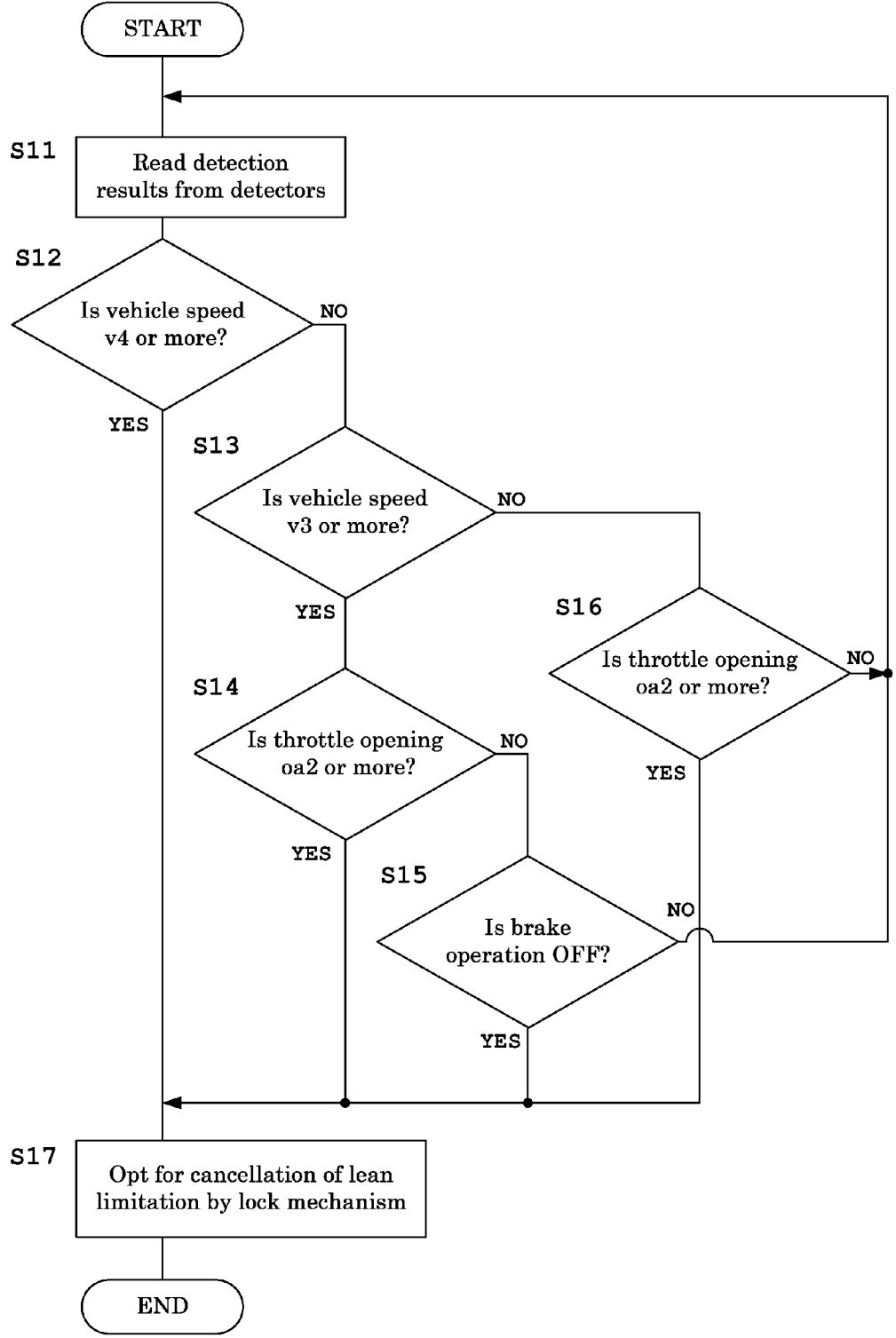
FIG. 11 is a flow chart showing an example of procedure for the lock state determiner to determine whether the vehicle is in state a, state b or state c.

Reference is made to FIG. 11. FIG. 11 is a flowchart showing an example of procedure for the lock state determiner 93 to determine whether the vehicle is in state a, in state b or in state c. It is assumed here that the lock mechanism 50 is in a state of limiting up-and-down motion of the right and left wheels 19 to lock leaning of the vehicle body.

<Step S11> Read Detection Results From Detectors

The lock state determiner 93 reads detection results from the throttle position sensor 81, speed sensors 83R and 83L and brake sensor 85 at regular intervals of time. The lock state determiner 93 selects the higher of the vehicle speeds detected by the speed sensors 83R and 83L. In the following description, the selected vehicle speed will be referred to simply as "vehicle speed".

<Step S12> Is Vehicle Speed v4 or More?

The lock state determiner 93 determines whether vehicle speed is equal to or higher than the fourth speed v4. When the result shows a vehicle speed equal to or higher than the fourth speed v4, the operation proceeds to step S17. Otherwise, the operation proceeds to step S13.

<Step S13> Is Vehicle Speed v3 or More?

The lock state determiner 93 determines whether vehicle speed is equal to or higher than the third speed v3. When the result shows a vehicle speed equal to or higher than the third speed v3, the operation proceeds to step S14. Otherwise, the operation returns to step S16.

<Step S14> Is Throttle Opening oa2 or More?

The lock state determiner 93 determines whether throttle opening is equal to or larger than the second opening oa2. When the result shows a throttle opening equal to or larger than the second opening oa2, the operation proceeds to step S17. Otherwise, the operation returns to step S15.

<Step S15> Is Brake Operation OFF?

The lock state determiner 93 determines whether a brake operation is OFF. When the result shows that a brake operation is OFF, the operation proceeds to step S17. Otherwise, the operation returns to step S11

<Step S16> Is Throttle Opening oa2 or More?

The lock state determiner 93 makes the same determination as in step S14. When the result shows a throttle opening equal to or larger than the second opening oa2, the operation proceeds to step S17. Otherwise, the operation returns to step S11.

<Step S17> Opt for Cancellation of Lean Limitation By Lock Mechanism

The lock state determiner 93 opts for cancellation of the lean limitation by the lock mechanism 50 to the up-and-down motion of the right and left wheels 19.

This procedure does not determine whether the vehicle is in state a, state b or state c. However, when the vehicle is in at least one of state a, state b and state c, the operation always proceeds to step S17. With such procedure, the lock state determiner 93 can determine conveniently that the vehicle is in at least one of state a, state b and state c.

When the lock state determiner 93 opts for cancellation of the lean limitation by the lock mechanism 50, it gives the determination information to the lock mechanism controller 95. The lock mechanism controller 95 outputs a PWM signal to the drive circuit 97 for moving (withdrawing) the movable portion 53a to a predetermined position. The drive circuit 97 supplies the solenoid 53 with a current according to the PWM signal to move the movable portion 53a.

At this time, the lock mechanism controller 95 determines based on the detection result from the position detecting sensor 55 whether the movable portion 53a has disengaged from one of the small bores 51a (i.e. whether it has operated normally or not). When it is determined that the movable portion 53a has operated normally, the operation control of the lock mechanism 50 is completed. Otherwise, the lock mechanism controller 95 outputs a PWM signal to the drive circuit 97 again to move the movable portion 53a.

When movable portion 53a is disengaged from one of the small bores 51a, the right and left wheels 19 become movable up and down relative to the vehicle body. With the up-and-down motion of the right and left wheels 19, the right and left wheels 63 also move up and down, thereby leaning the body of the saddle riding type vehicle 1. In this way, the saddle riding type vehicle 1 becomes capable of leaning when the lean limitation by the lock mechanism 50 is canceled. Then, the rider can drive the saddle riding type vehicle 1 while leaning the vehicle 1.

Thus, with the saddle riding type vehicle 1 in this preferred embodiment, the controller 91 controls the lock mechanism 50 to limit the up-and-down motion of the right and left wheels 19 and to cancel the lean limitation automatically. The rider need not carry out a special manual control for operating the lock mechanism 50. In addition, the controller 91 controls the lock mechanism 50 based on the detection results from the various sensors 81, 83R, 83L and 85 which detect the states of the vehicle body, thereby allowing the rider to travel lightly and comfortably.

When the vehicle has gone into either state A or state B, the lock state determiner 93 causes the lock mechanism 50 to engage the lean limitation. This can cope with various situations at the time of actually stopping the saddle riding type vehicle 1. Similarly, when the vehicle has gone into one of state a, state b, and state c, the lean limitation by the lock mechanism 50 is canceled. This can cope with various situations at the time of actually starting or driving the saddle riding type vehicle 1.

A defective operation of the lock mechanism 50 can be detected effectively by providing the position detecting sensor 55. When the lock mechanism 50 is determined not to be operating normally, the lock mechanism controller 95 controls the lock mechanism 50 again. Thus, the lock mechanism 50 is normally operable with increased reliability.

The lock mechanism 50 with the solenoid 53 can secure excellent operating response. Further, compared with a lock mechanism using a hydraulic circuit, for example, the lock mechanism 50 can realize space savings and weight savings.

With the lock mechanism 50, the front balancer beam 27 can be locked against rotation relative to the main frame 11. Thus, up-and-down motions of the four, right and left wheels 19 and 63 can be restricted all together. This realizes a simplified structure of the lock mechanism 50.

The present invention is not limited to the foregoing preferred embodiment, but may be modified as described below.

In the foregoing preferred embodiment, the lock state determiner 93 preferably opts for the lean limitation by the lock mechanism 50 when the vehicle is in at least one of state A and state B. The present invention is not limited to this. For example, the lean limitation may be put by the lock mechanism 50 only when the vehicle is in state A, or only when the vehicle is in state B.

Similarly, the lock state determiner 93 preferably opts for cancellation of the lean limitation by the lock mechanism 50 when the vehicle is in at least one of state a, state b and state c. The present invention is not limited to this. For example, the lean limitation by the lock mechanism 50 may be canceled only when the vehicle is in state a, only when the vehicle is in state b, or only when the vehicle is in state c. The lean limitation by the lock mechanism 50 may be canceled when the vehicle is in one of any two states, such as one of state a and state b.

In the foregoing preferred embodiment, state A and state B are defined to overlap each other. The present invention is not limited to this. A modification may be made to define state A and state B not to overlap each other. Similarly, state a, state b and state c are defined to overlap one another, but the present invention is not limited to this.

FIG. 10 shows an example of procedure followed by the lock state determiner 93 in determining whether the vehicle is in at least one of states A and B in the foregoing preferred embodiment. The present invention is not limited to this. In the procedure shown in FIG. 10, determinations are made with respect to vehicle speed (steps S2, S3), throttle opening (steps S4, S5) and brake operation (Step S6) in the stated order. However, the vehicle states may be determined in any other order. Alternatively, the determinations with respect to vehicle speed, throttle opening and brake operation may be made at the same time.

The procedure shown in FIG. 10 preferably does not determine whether the vehicle is in state A, or whether the vehicle is in state B. The present invention is not limited to this. A modification may be made to determine whether the vehicle is in state A and whether the vehicle is in state B. These determinations may be made in parallel, or may be staggered in time. Depending on a result of a preceding determination, the succeeding determination may be omitted.

FIG. 11 shows an example of procedure followed by the lock state determiner 93 in determining whether the vehicle is in at least one of state a, state b and state c in the foregoing preferred embodiment. The present invention is not limited to this. Modifications may be made as described above.

In the foregoing preferred embodiment, the lock state determiner 93 preferably goes through the separate procedures shown in FIGS. 10 and 11 for determining whether the vehicle is in at least one of states A and B, and for determining whether the vehicle is in at least one of state a, state b and state c. Instead, the determinations may be made through the same procedure. This can be realized by appropriately combining steps of branching the operation regarding vehicle speed by using the first to fourth vehicle speeds v1-v4, steps of branching the operation regarding throttle opening by using the first and second openings oa1 and oa2, and a step of determining the presence or absence of a brake operation.

The foregoing preferred embodiment preferably provides specific examples of various sensors 81, 83R, 83L and 85 for detecting vehicle states. Other equivalent sensors may be selected for detecting vehicle states. Specifically, the throttle position sensor 81 detects the throttle opening in the foregoing preferred embodiment, but the present invention is not limited to this. For example, the throttle position sensor 81 may be replaced with a sensor which detects an amount of operation of the accelerator grip 42 (FIG. 1) (accelerator opening). Where an electronic throttle system is preferably used, a modification may be made to input detection results of an acceleration sensor included in this system also to the controller 91.

The speed sensors 83 may be replaced with sensors which detect wheel speeds of the right and left wheels 19, or a sensor which detects vehicle speed in a location other than the wheels. The brake sensor 85 may detect the presence or absence of a brake operation on the right and left wheels 19.

In the foregoing preferred embodiment, the lock state determiner 93 preferably adopts, as "vehicle speed", the higher of the vehicle speeds detected by the speed sensors 83R and 83L, and preferably compares the adopted "vehicle speed" with the first speed v1 and second speed v2. The present invention is not limited to this. For example, the lock state determiner 93 may use only the vehicle speed detected by one of the speed sensor 83R and speed sensor 83L for comparison. Or an average value may be calculated of the vehicle speeds detected by both the speed sensors 83R and 83L, and this average value may be used as "vehicle speed" for comparison.

The lock mechanism 50 preferably includes the disk 51 and solenoid 53. The movable portion 53a of the solenoid 53 connects to and withdraws from the small bores 51a formed in the disk 51, to limit the up-and-down motion of the right and left wheels 19 and to cancel the lean limit. The present invention is not limited to this. For example, a modification may be made to provide a brake pad for pressing against a side surface of the disk 51 to inhibit rotation thereof. The lock mechanism 50 constructed in this way can also limit the up-and-down motion of the right and left wheels 19 and cancel the lean limit.

The foregoing preferred embodiment may be modified to further include an input unit for accepting a command from the rider for at least either of the lean limitation by the lock mechanism 50 and its cancellation. The lock state determiner 93 may make a determination based on the command from this input unit. This construction will enable the rider to operate lock mechanism 50 directly. In this case, an order of priority may be set appropriately between control of the lock mechanism 50 based on the command given from the input unit, and control of the lock mechanism 50 based on the detection results from the various sensors 81, 83R, 83L and 85. Where, for example, priority is placed on control of the lock mechanism 50 based on the command given from the input unit, the lock mechanism 50 can be operated according to the command given by the rider.

In the foregoing preferred embodiment, the lock mechanism 50 preferably is constructed to limit the up-and-down motion of the right and left wheels 19. The present invention is not limited to this. For example, a lock mechanism may be added for limiting up-and-down motion of the right and left wheels 63 provided at the rear of the vehicle body. Lock mechanisms may be provided for both the right and left wheels 19 and 63, respectively.

In the foregoing preferred embodiment, the lock mechanism 50 preferably locks the front balancer beam 27 against rotation relative to the vehicle body (main frame 11). The present invention is not limited to this. For example, the lock mechanism 50 may be modified for locking one or some of the lower swing arms 13, upper swing arms and front tubes 17 constituting the right side support mechanism and left side support mechanism, against movement or rotation relative to the vehicle body (main frame 11). A known lock mechanism may be used as appropriate according to the member or members to be locked against movement or rotation.

In the foregoing preferred embodiment, the support mechanism preferably is roughly divided into the right side support mechanism for vertically movably supporting the right wheel 19R, the left side support mechanism for vertically movably supporting the left wheel 19L, and the balancer mechanism rotatably supported by the main frame 11 and interlocked to the right side support mechanism and left side support mechanism for allowing the right wheel 19R and left wheel 19R to move up and down in the same amount in opposite directions. The right side support mechanism has the lower right swing arm 13R, and is directly and pivotably supported by the main frame 11. The left side support mechanism has the lower left swing arm 13L, and is directly and pivotably supported by the main frame 11. However, each of the right side support mechanism and left side support mechanism is not limited to such construction. For example, each of the right side support mechanism and left side support mechanism may be vertically movably supported by the balancer mechanism, to be indirectly supported by the main frame 11 through this balancer mechanism.

The foregoing preferred embodiment is described with reference to a four-wheeled vehicle having the right and left wheels 19 and 63 at the front and rear of the vehicle body. The vehicle may be changed to a three-wheeled vehicle having one wheel at the front or rear.

The preferred embodiments and the modifications described above may be further varied as appropriate by replacing or combining certain components with other modifications.

The present invention may be embodied in other specific forms without departing from the spirit or essential attributes thereof and, accordingly, reference should be made to the appended claims, rather than to the foregoing specification, as indicating the scope of the invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A saddle riding type vehicle capable of making turns by leaning a vehicle body, comprising:
    a support mechanism arranged to support at least a pair of wheels provided at opposite sides of the vehicle body to be movable up and down relative to the vehicle body;
    a lean limiting mechanism connected to the support mechanism and arranged to limit up-and-down motion of the pair of wheels;
    a state detecting device arranged to detect vehicle states; and
    a controller arranged to control the lean limiting mechanism based on results of detection obtained by the state detecting device; wherein
    the state detecting device includes a vehicle speed detector arranged to detect a vehicle speed, and a throttle position detector arranged to detect a throttle opening; and
    the controller is arranged to cause the lean limiting mechanism to set a lean limitation when the vehicle speed is below a predetermined first speed and the throttle opening is below a predetermined first opening.

2. The vehicle according to claim 1, wherein:
    the state detecting device further includes a brake detector arranged to detect a brake operation; and
    the controller is arranged to cause the lean limiting mechanism to set the lean limitation when the vehicle speed is below a predetermined second speed that is higher than the predetermined first speed, the throttle opening is below the predetermined first opening, and the brake operation is detected.

3. The vehicle according to claim 1, wherein:
    the controller is arranged to cancel the lean limitation by the lean limiting mechanism when the throttle opening exceeds a predetermined opening that is larger than the predetermined first opening.

4. The vehicle according to claim 1, wherein:
    the controller is arranged to cancel the lean limitation by the lean limiting mechanism when the vehicle speed exceeds a predetermined speed that is higher than the predetermined first speed.

5. The vehicle according to claim 1, wherein:
    the state detecting device further includes a brake detector arranged to detect a brake operation; and
    the controller is arranged to cancel the lean limitation by the lean limiting mechanism when the vehicle speed exceeds a predetermined speed that is higher than the predetermined first speed and the brake operation is off.

6. The vehicle according to claim 1, wherein:
    the state detecting device further includes a brake detector arranged to detect a brake operation; and
    the controller is arranged to cancel the lean limitation by the lean limiting mechanism when the vehicle is in at least one of: a state in which the vehicle speed exceeds a third speed that is higher than the predetermined first speed and the brake operation is off, and a state in which the vehicle speed exceeds a fourth speed that is higher than the third speed.

7. The vehicle according to claim 2, wherein the controller is arranged to cancel the lean limitation by the lean limiting mechanism when the vehicle is in at least one of the following states: state (a) in which the throttle opening exceeds a second opening that is larger than the predetermined first opening; state (b) in which the vehicle speed exceeds a third speed which is higher than the predetermined first speed and lower than the predetermined second speed, and the brake operation is off; and state (c) in which the vehicle speed exceeds a fourth speed higher than the second speed.

8. The vehicle according to claim 1, further comprising an input unit arranged to accept a command from a rider to request at least one of a lean limitation by the lean limiting mechanism and cancellation of the lean limitation, wherein the controller is arranged to control the lean limiting mechanism based on the command from the input unit.

9. The vehicle according to claim 1, further comprising an operation detector arranged to detect an operating state of the lean limiting mechanism, wherein the controller is arranged to determine, based on a result of detection by the operation detector, whether the lean limiting mechanism is operating normally.

10. The vehicle according to claim 1, wherein:
    the lean limiting mechanism includes a solenoid having a movable portion, and a connector to which the movable portion is connected, the movable portion being arranged to connect to and withdraw from the connector to set a lean limitation to limit up-and-down motion of the pair of wheels and to cancel the lean limitation; and
    the controller is arranged to control electrical current to the solenoid to connect to and withdraw the movable portion and the connector.

11. The vehicle according to claim 1, wherein the support mechanism includes:
    a right side support mechanism arranged to vertically movably support a right wheel of the pair of wheels;
    a left side support mechanism arranged to vertically movably support a left wheel of the pair of wheels; and
    a balancer mechanism rotatably supported by the vehicle body and interlocked with the right side and left side support mechanisms to allow the right wheel and the left wheel to move up and down in corresponding amounts in opposite directions; and
    the lean limiting mechanism is arranged to lock the balancer mechanism against rotation, thereby to limit up-and-down motion of the pair of wheels.

* * * * *